(12) United States Patent
Takeuchi et al.

(10) Patent No.: US 9,278,329 B2
(45) Date of Patent: Mar. 8, 2016

(54) HYDROGEN GENERATOR AND FUEL CELL SYSTEM INCLUDING SAME

(71) Applicant: Panasonic Intellectual Property Management Co., Ltd., Osaka (JP)

(72) Inventors: Tomoya Takeuchi, Shiga (JP); Kiyoshi Taguchi, Osaka (JP); Yuji Mukai, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/405,748

(22) PCT Filed: Apr. 10, 2014

(86) PCT No.: PCT/JP2014/002074
§ 371 (c)(1),
(2) Date: Dec. 4, 2014

(87) PCT Pub. No.: WO2014/167864
PCT Pub. Date: Oct. 16, 2014

(65) Prior Publication Data
US 2015/0165409 A1    Jun. 18, 2015

(30) Foreign Application Priority Data
Apr. 11, 2013    (JP) .................. 2013-082715

(51) Int. Cl.
*H01M 8/04* (2006.01)
*B01J 19/00* (2006.01)
(Continued)

(52) U.S. Cl.
CPC ............ *B01J 19/0013* (2013.01); *B01J 8/0285* (2013.01); *C01B 3/38* (2013.01);
(Continued)

(58) Field of Classification Search
CPC ............ H01M 8/0612; H01M 8/0618; H01M 8/04776; H01M 8/04373; H01M 8/0675; H01M 8/04022; H01M 8/04223; H01M 8/0631; H01M 8/0662; H01M 8/04089; H01M 8/04097; H01M 8/0438; H01M 8/04425; H01M 8/0444
See application file for complete search history.

(56) References Cited

U.S. PATENT DOCUMENTS

| 2004/0013917 | A1* | 1/2004 | Ukai ................. B01J 8/025 429/423 |
| 2007/0101647 | A1 | 5/2007 | Miyauchi et al. |
| 2011/0014528 | A1 | 1/2011 | Kani et al. |
| 2013/0143136 | A1 | 6/2013 | Ukai et al. |

FOREIGN PATENT DOCUMENTS

| JP | 2004-067407 A | 3/2004 |
| JP | 2007-331951 A | 12/2007 |

(Continued)

OTHER PUBLICATIONS

International Search Report issued in International Application No. PCT/JP2014/002074 dated May 20, 2014.

*Primary Examiner* — Patrick Ryan
*Assistant Examiner* — Ben Lewis
(74) *Attorney, Agent, or Firm* — McDermott Will & Emery LLP

(57) ABSTRACT

A hydrogen generator includes: a desulfurizer including a desulfurization catalyst that removes a sulfur compound in a raw material by a desulfurization reaction, the desulfurization catalyst being arranged so as to be heated by a first heat source; a reformer configured to generate a hydrogen-containing gas using the raw material having flowed through the desulfurizer; a first temperature detector configured to detect a temperature of a predetermined portion of the desulfurization catalyst; a second temperature detector configured to detect the temperature of a portion of the desulfurization catalyst, the portion being located such that a distance between the portion and the first heat source is longer than a distance between the predetermined portion and the first heat source; and a controller configured to control an operation of heating the desulfurization catalyst by the first heat source, based on detection results of the first temperature detector and the second temperature detector.

16 Claims, 13 Drawing Sheets

(51) Int. Cl.
  *C01B 3/38* (2006.01)
  *H01M 8/06* (2006.01)
  *B01J 8/02* (2006.01)

(52) U.S. Cl.
  CPC ....... *H01M 8/04373* (2013.01); *H01M 8/0612* (2013.01); *H01M 8/0618* (2013.01); *H01M 8/0675* (2013.01); *B01J 2208/00061* (2013.01); *B01J 2219/002* (2013.01); *B01J 2219/00132* (2013.01); *B01J 2219/00213* (2013.01); *B01J 2219/00238* (2013.01); *C01B 2203/0205* (2013.01); *C01B 2203/127* (2013.01)

(56) References Cited

FOREIGN PATENT DOCUMENTS

| | | |
|---|---|---|
| JP | 2009-078938 A | 4/2009 |
| JP | 2010-222208 A | 10/2010 |
| JP | 2010-225284 A | 10/2010 |
| JP | 2010-225285 A | 10/2010 |
| JP | 2010-235380 A | 10/2010 |
| JP | 2012-056807 A | 3/2012 |
| JP | 2012-082088 A | 4/2012 |
| JP | 2012-116666 A | 6/2012 |

* cited by examiner

HYDROGEN GENERATOR AND FUEL CELL SYSTEM INCLUDING SAME

RELATED APPLICATIONS

This application is the U.S. National Phase under 35 U.S.C. §371 of International Application No. PCT/JP2014/002074, filed on Apr. 10, 2014, which in turn claims the benefit of Japanese Application No. 2013-082715, filed on Apr. 11, 2013, the disclosures of which are incorporated by reference herein.

TECHNICAL FIELD

The present invention relates to a hydrogen generator and a fuel cell system including the hydrogen generator. More specifically, the present invention relates to a hydrogen generator including a desulfurizer and a fuel cell system including the hydrogen generator.

BACKGROUND ART

PTL 1 discloses a hydrogen generator including: a desulfurizer including a hollow container in which a catalyst that adsorbs a sulfur compound contained in a material gas is contained; a reformer portion configured to generate a hydrogen-containing reformed gas by a reforming reaction using the material gas having flowed through the desulfurizer and water; and a heater configured to heat the desulfurizer, wherein: the desulfurizer is arranged outside the reformer portion so as to be spaced apart from the reformer portion; and the heater is formed in a spiral shape along an inner wall of an outer surface of the desulfurizer and is arranged so as to be spaced apart from the reformer portion.

CITATION LIST

Patent Literature

PTL 1: Japanese Laid-Open Patent Application Publication No. 2012-082088

SUMMARY OF INVENTION

Technical Problem

According to conventional hydrogen generators, it has been difficult to maintain the temperature of a desulfurization catalyst within an appropriate range in some cases.

The present invention was made to solve the above problems, and an object of the present invention is to provide a hydrogen generator by which the temperature of a desulfurization catalyst is easily maintained within an appropriate range, and a fuel cell system including the hydrogen generator.

Solution to Problem

A hydrogen generator according to one aspect of the present invention includes: a desulfurizer including a desulfurization catalyst that removes a sulfur compound in a raw material, the desulfurization catalyst being arranged so as to be heated by a first heat source; a reformer configured to generate a hydrogen-containing gas using the raw material having flowed through the desulfurizer; a first temperature detector configured to detect a temperature of a predetermined portion of the desulfurization catalyst; a second temperature detector configured to detect the temperature of a portion of the desulfurization catalyst, the portion being located such that a distance between the portion and the first heat source is longer than a distance between the predetermined portion and the first heat source; and a controller configured to control an operation of heating the desulfurization catalyst by the first heat source, based on detection results of the first temperature detector and the second temperature detector.

A fuel cell system according to one aspect of the present invention includes: the above hydrogen generator; and a fuel cell configured to generate electric power using the hydrogen-containing gas supplied from the hydrogen generator.

Advantageous Effects of Invention

The aspect of the present invention has an effect of being able to provide the hydrogen generator by which the temperature of the desulfurization catalyst is easily maintained within the appropriate range, and the fuel cell system including the hydrogen generator.

DESCRIPTION OF EMBODIMENTS

Figure 1:
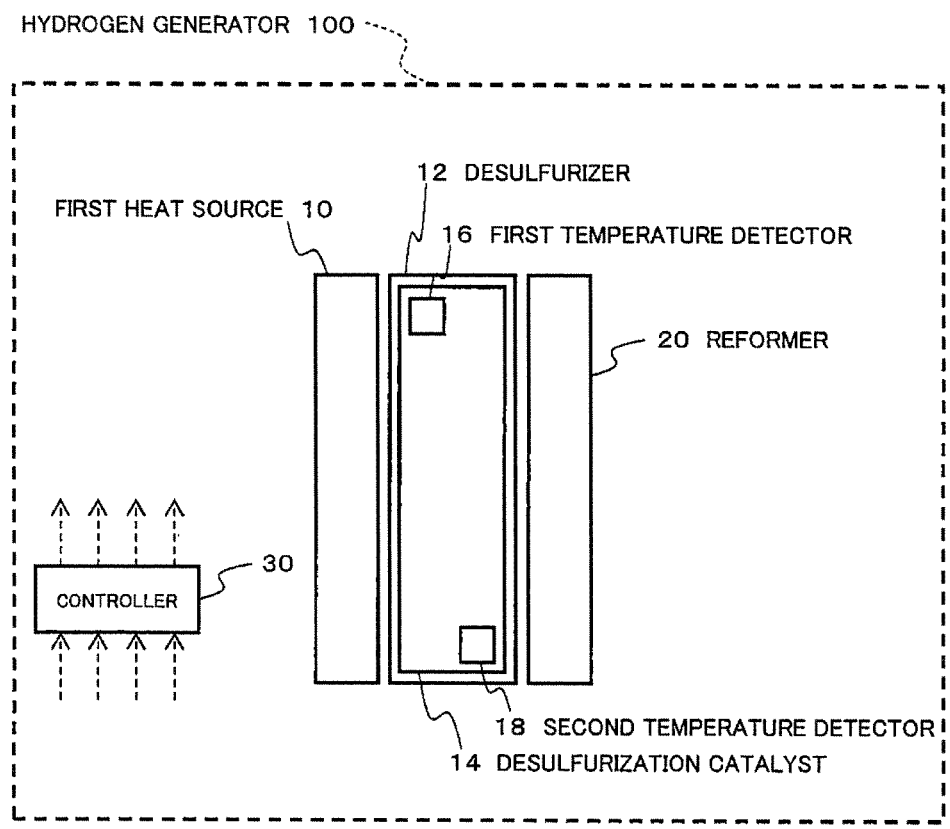
FIG. 1 is a schematic diagram showing one example of a schematic configuration of a hydrogen generator according to Embodiment 1.

Diligent studies have been made in order to maintain the temperature of a hydrodesulfurization catalyst within an appropriate range. As a result, the following findings have been obtained.

According to the hydrogen generator described in PTL 1, heat from the heater used at the time of start-up is efficiently transferred to a hydro-desulfurizer. With this, a reduction in a start-up time and an increase in durability of the heater are realized.

According to the above conventional hydrogen generator, it becomes difficult to maintain the hydrodesulfurization catalyst at an appropriate temperature in some cases. As a result of the studies, it was found that a cause of the above problem is that since a temperature detector of the hydro-desulfurizer is provided at one place, the temperature detector cannot detect the temperature of a portion in the hydrodesulfurization catalyst which tends to become low in temperature or the temperature of a portion in the hydrodesulfurization catalyst which tends to become high in temperature. Thus, a configuration has been obtained, in which: temperature detectors are respectively arranged at a plurality of portions of the hydrodesulfurization catalyst; and the heating of the hydrodesulfurization catalyst is controlled based on detection results of the temperature detectors.

This configuration is effective in not only the desulfurizer using the hydrodesulfurization catalyst but also a desulfurizer using the other desulfurization catalyst used at a temperature higher than the normal temperature.

Hereinafter, respective embodiments will be explained in reference to the attached drawings. Numerical values, shapes, materials, components, positions and connection states of the components, steps, the order of the steps, and the like in respective embodiments are just examples. Among the components in the following embodiments, components that are not described in independent claims that recite broadest concepts of the present invention will be explained as arbitrary components constituting a more desirable mode. Explanations of the components having the same reference sign in the drawings may be omitted. For ease of understanding of the drawings, respective components are schematically shown, so that the shapes, dimensional ratios, and the like may not be shown correctly. Regarding a manufacturing method, the order of the steps and the like can be changed according to need, and the other publicly known steps can be added.

Embodiment 1

A hydrogen generator according to Embodiment 1 includes: a desulfurizer including a desulfurization catalyst that removes a sulfur compound in a raw material, the desulfurization catalyst being arranged so as to be heated by a first heat source; a reformer configured to generate a hydrogen-containing gas using the raw material having flowed through the desulfurizer; a first temperature detector configured to detect a temperature of a predetermined portion of the desulfurization catalyst; a second temperature detector configured to detect the temperature of a portion of the desulfurization catalyst, the portion being located such that a distance between the portion and the first heat source is longer than a distance between the predetermined portion and the first heat source; and a controller configured to control an operation of heating the desulfurization catalyst by the first heat source, based on detection results of the first temperature detector and the second temperature detector.

According to this configuration, the temperature of the desulfurization catalyst is more easily maintained within an appropriate range.

Device Configuration

FIG. 1 is a schematic diagram showing one example of a schematic configuration of the hydrogen generator according to Embodiment 1. Hereinafter, a hydrogen generator 100 according to Embodiment 1 will be explained in reference to FIG. 1.

In the example shown in FIG. 1, the hydrogen generator 100 includes a first heat source 10, a desulfurizer 12, a first temperature detector 16, a second temperature detector 18, a reformer 20, and a controller 30.

The desulfurizer 12 includes a desulfurization catalyst 14 that removes the sulfur compound in the raw material. For example, the desulfurizer 12 removes the sulfur compound, contained in the material gas supplied to the reformer, at a temperature (for example, 200° C. to 400° C.) higher than the normal temperature by a hydrogenation reaction. The desulfurizer 12 is not limited to a hydro-desulfurizer. The other desulfurizer may be used as long as the desulfurizer is used at a temperature higher than the normal temperature. For example, the desulfurizer 12 may be a desulfurizer filled with a desulfurization catalyst containing a solid acid desulfurizing agent or a desulfurizer filled with a desulfurization catalyst containing a heating adsorption desulfurizing agent. For example, the desulfurizer 12 is configured such that the desulfurization catalyst 14 is filled in a container.

Examples of the raw material include: gases (such as a city gas containing methane as a major component, a natural gas, and a LPG) containing an organic compound constituted by at least carbon and hydrogen as constituent elements; kerosene; and alcohols (such as methanol and ethanol). The city gas is a gas supplied from a gas company through pipes to respective houses and the like.

The desulfurization catalyst 14 is arranged so as to be heated by the first heat source 10. Specifically, for example, the desulfurization catalyst 14 and the first heat source 10 are arranged adjacent to a wall of the container of the desulfurizer 12 so as to sandwich the wall of the container.

The desulfurization catalyst 14 is a hydrodesulfurization catalyst. For example, used as the desulfurization catalyst 14 is a CuZn-based catalyst (for example, a Cu—Zn—Ni-based catalyst or a Cu—Zn—Fe-based catalyst) having both a function of converting the sulfur compound into hydrogen sulfide and a function of adsorbing the hydrogen sulfide. The desulfurization catalyst 14 is not limited to this example and may be constituted by a CoMo-based catalyst that converts the sulfur compound in the material gas into the hydrogen sulfide and a ZnO-based catalyst or Cu—Zn-based catalyst that is a sulfur adsorbent that is provided downstream of the CoMo-based catalyst and adsorbs and removes the hydrogen sulfide. The desulfurization catalyst 14 may be any other catalyst as long as the desulfurization catalyst is used at a temperature higher than the normal temperature. For example, the desulfurization catalyst 14 may be a solid acid desulfurizing agent (a Lewis acid desulfurizing agent, an alumina desulfurizing agent, or the like; see Japanese Laid-Open Patent Application Publication No. 2010-138013) or a heating adsorption desulfurizing agent (a transition metal-based desulfurizing agent, a Ni-based desulfurizing agent, or a Cu-based desulfurizing agent; see Japanese Laid-Open Patent Application Publication No. 2006-111766).

The sulfur compound may be a sulfur component artificially added to the raw material as an odorant component or a natural sulfur compound derived from the raw material itself. Specifically, examples of the sulfur compound include tertiary-butylmercaptan (TBM), dimethyl sulfide (DMS), tetrahydrothiophene (THT), carbonyl sulfide (COS), and hydrogen sulfide.

The first heat source 10 is arranged so as to be able to heat the desulfurization catalyst 14. For example, an electric heater is used as the first heat source 10. For example, a combustor configured to generate a flue gas from combustion fuel and combustion air is used as the first heat source 10.

The first temperature detector 16 detects the temperature of the predetermined portion of the desulfurization catalyst 14. For example, the predetermined portion of the desulfurization catalyst 14 may be a portion that tends to become relatively high in temperature while the first heat source 10 is heating the desulfurization catalyst 14 at the time of the start-up of the hydrogen generator 100. For example, the predetermined portion of the desulfurization catalyst 14 may be a portion that tends to have the highest temperature while the first heat source 10 is heating the desulfurization catalyst 14 at the time of the start-up of the hydrogen generator 100 or may be a portion that tends to become higher in temperature than an average while the first heat source 10 is heating the desulfurization catalyst 14 at the time of the start-up of the hydrogen generator 100.

For example, the predetermined portion of the desulfurization catalyst 14 may be a portion that tends to have the highest temperature when the desulfurization catalyst 14 is heated only by the first heat source 10. For example, the predetermined portion of the desulfurization catalyst 14 may be a portion closest to the first heat source 10. In a case where the temperature of the first heat source 10 is nonuniform, the predetermined portion of the desulfurization catalyst 14 may be, for example, a portion adjacent to a portion, having the highest temperature, of the first heat source 10.

In a case where the container of the desulfurizer 12 includes a first wall surface and a second wall surface opposed to each other, and the first heat source 10 is provided adjacent to the first wall surface of the desulfurizer 12, the first temperature detector 16 may be, for example, arranged such that a distance between the first temperature detector 16 and the first wall surface is shorter than a distance between the first temperature detector 16 and the second wall surface. While the first heat source 10 is heating the desulfurization catalyst 14 at the time of the start-up of the hydrogen generator 100, the desulfurizer 12 is mainly heated by the first heat source 10. Therefore, the first wall surface tends to become higher in temperature than the second wall surface. Since the first temperature detector 16 is arranged close to the first wall surface, the first temperature detector 16 can detect the temperature of a high-temperature side of the desulfurizer 12. In FIG. 1, the first temperature detector 16 is arranged at an upper portion of the desulfurizer 12. However, for example, the first temperature detector 16 may be arranged at a middle portion, a lower portion, or the like of the desulfurizer 12. For example, a thermocouple, a thermistor, or the like may be used as the first temperature detector 16.

The second temperature detector 18 detects the temperature of a portion of the desulfurization catalyst 14, the portion being located such that a distance between the portion and the first heat source 10 is longer than a distance between the predetermined portion (the portion whose temperature is detected by the first temperature detector 16) and the first heat source 10. The portion of the desulfurization catalyst 14 (the portion being located such that a distance between the portion and the first heat source 10 is longer than a distance between the predetermined portion and the first heat source 10) may be, for example, a portion that tends to become relatively low in temperature while the first heat source 10 is heating the desulfurization catalyst 14 at the time of the start-up of the hydrogen generator 100. For example, the portion of the desulfurization catalyst 14 may be a portion that tends to have the lowest temperature while the first heat source 10 is heating the desulfurization catalyst 14 at the time of the start-up of the hydrogen generator 100 or may be a portion that tends to become lower in temperature than an average while the first heat source 10 is heating the desulfurization catalyst 14 at the time of the start-up of the hydrogen generator 100. The portion of the desulfurization catalyst 14 may be, for example, a portion that tends to become low in temperature and is located in the vicinity of an entrance of the desulfurizer 12. Since the raw material supplied to the desulfurizer 12 is low in temperature, the portion in the vicinity of the entrance of the desulfurizer 12 tends to become low in temperature.

For example, the portion of the desulfurization catalyst 14 may be a portion that tends to have the lowest temperature when the desulfurization catalyst 14 is heated only by the first heat source 10. The portion of the desulfurization catalyst 14 may be, for example, a portion located farthest from the first heat source 10. In a case where the temperature of the first heat source 10 is nonuniform, the portion of the desulfurization catalyst 14 may be, for example, a portion located farthest from the portion, having the highest temperature, of the first heat source 10.

In a case where the container of the desulfurizer 12 includes the first wall surface and the second wall surface opposed to each other, and the first heat source 10 is provided adjacent to the first wall surface of the desulfurizer 12, the second temperature detector 18 may be, for example, arranged such that a distance between the second temperature detector 16 and the second wall surface is shorter than a distance between the second temperature detector 16 and the first wall surface. While the first heat source 10 is heating the desulfurization catalyst 14 at the time of the start-up of the hydrogen generator 100, the desulfurizer 12 is mainly heated by the first heat source 10. Therefore, the second wall surface tends to become lower in temperature than the first wall surface. Since the second temperature detector 18 is arranged close to the second wall surface, the second temperature detector 18 can detect the temperature of a low-temperature side of the desulfurizer 12. In FIG. 1, the second temperature detector 18 is arranged at the lower portion of the desulfurizer 12. However, for example, the second temperature detector 18 may be arranged at the middle portion, the upper portion, or the like of the desulfurizer 12. For example, a thermocouple, a thermistor, or the like may be used as the second temperature detector 18.

The reformer 20 generates the hydrogen-containing gas from the raw material and steam. The reforming reaction proceeded by the reformer 20 may be any reaction. Specific examples of the reforming reaction include a steam-reforming reaction, an autothermal reaction, and a partial oxidation reaction. Devices required for respective reforming reactions may be suitably provided. For example, in a case where the reforming reaction is the steam-reforming reaction, a combustor configured to heat the reformer, an evaporator configured to generate the steam, and a water supply unit configured to supply water to the evaporator may be provided. In a case where the reforming reaction is the autothermal reaction, an air supply unit configured to supply air to the reformer may be additionally provided.

The controller 30 controls the operation of heating the desulfurization catalyst 14 by the first heat source 10, based on the detection results of the first temperature detector 16 and the second temperature detector 18. The controller 30 is only required to have a control function and includes a calculation processing portion (not shown) and a storage portion (not shown) configured to store a control program. Examples of the calculation processing portion include an MPU and a CPU. One example of the storage portion is a memory. The controller may be constituted by a single controller configured to perform centralized control or may be constituted by a plurality of controllers that cooperate to perform distributed control.

When controlling a heating amount of the first heat source 10, the heating amount being for the desulfurization catalyst 14, the temperature of the first heat source changes. For example, when the heating amount of the first heat source 10 is increased, the temperature of the first heat source 10 increases. When the heating amount of the first heat source 10 is decreased, the temperature of the first heat source 10 decreases.

In the present embodiment, the controller 30 controls the operation of heating the desulfurization catalyst 14, based on the detection results of the temperature detectors 16 and 18 arranged at a plurality of portions of the desulfurization catalyst 14. Therefore, the temperature of the desulfurization catalyst 14 is more easily maintained within the appropriate range.

The first heat source 10 may be arranged outside the desulfurizer 12. According to this configuration, assembling work becomes dramatically easier than that in a case where the first heat source 10, such as a heater, is arranged inside the desulfurizer 12.

Embodiment 2

The hydrogen generator according to Embodiment 2 is configured such that in the hydrogen generator according to Embodiment 1, when the temperature detected by the second temperature detector becomes equal to or higher than a first threshold, the controller decreases a heating amount of the first heat source.

According to this configuration, for example, if there is a possibility that the temperature of the substantially entire desulfurization catalyst is within an appropriate temperature range while the first heat source is heating the desulfurization catalyst at the time of the start-up of the hydrogen generator, the heating operation performed by the first heat source can be reduced. Therefore, a possibility that energy is consumed by the unnecessary heating operation can be reduced.

The first threshold is set as a value that is equal to or higher than a lower limit of a use temperature of the desulfurization catalyst. The use temperature is a temperature appropriate for the use of the desulfurization catalyst and is a temperature at which the desulfurization performance is appropriately achieved. While the desulfurization catalyst is being used, the temperature control is performed such that the catalyst temperature becomes the use temperature.

The device configuration of the hydrogen generator according to Embodiment 2 may be the same as that according to Embodiment 1 except for details of the control by the controller 30, that is, the method of operating the hydrogen generator. Therefore, the same reference signs and names are used for the same components as in FIG. 1, and detailed explanations thereof are omitted.

Embodiment 2 can be modified in the same manner as Embodiment 1.

Operating Method

Figure 2:
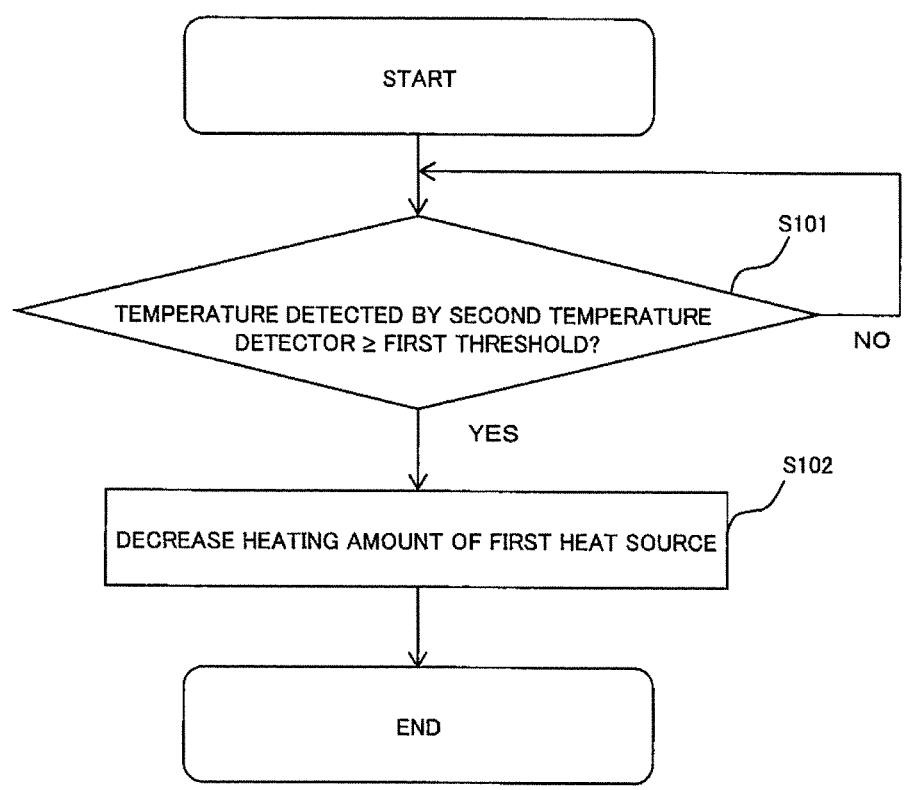
FIG. 2 is a flow chart showing one example of a method of operating the hydrogen generator according to Embodiment 2.

FIG. 2 is a flow chart showing one example of a method of operating the hydrogen generator according to Embodiment 2. Hereinafter, the method of operating the hydrogen generator according to Embodiment 2 will be explained in reference to FIG. 2. For example, the operating method shown in FIG. 2 may be executed in such a manner that the controller 30 controls respective portions of the hydrogen generator in accordance with the program stored in the controller 30.

When the operation of the hydrogen generator 100 is started (START), the first heat source 10 starts heating (increasing the temperature of) the desulfurizer 12. Then, whether or not the temperature detected by the second temperature detector 18 is equal to or higher than the first threshold is determined (Step S101).

If no in Step S101, Step S101 is executed again. If yes in Step S101, the heating amount of the first heat source 10 is decreased (Step S102). At this time, the heating amount of the first heat source 10 is suitably set, but the operation of heating the desulfurization catalyst 14 by the first heat source 10 may be stopped.

In a case where the desulfurization catalyst 14 is low in temperature, the hydrogenation reaction hardly proceeds, and the adsorption of the sulfur hardly occurs. When the raw material is supplied to the desulfurizer 12 in this state, the sulfur compound in the raw material is not adequately desulfurized by the desulfurizer 12 to be supplied to the downstream side, and this may, for example, reduce the life of the fuel cell. In this case, after the substantially entire desulfurization catalyst 14 is heated up to a temperature (use temperature) at which the desulfurization easily occurs, that is, after the temperature increase of the desulfurization catalyst 14 is completed, the raw material may be supplied to the desulfurizer 12.

As described above, for example, while the first heat source 10 is heating the desulfurization catalyst 14 at the time of the start-up of the hydrogen generator 100, the second temperature detector 18 detects the temperature of the portion that becomes relatively low in temperature in the desulfurization catalyst 14. When the temperature detected by the second temperature detector 18 becomes equal to or higher than the first threshold, the temperature of the desulfurization catalyst 14 becomes the appropriate temperature. Thus, the desulfurization can be performed at the substantially entire desulfurization catalyst 14.

The first threshold may be, for example, 150° C. or 165° C.

After the temperature detected by the second temperature detector 18 has become equal to or higher than the first threshold, the heating amount of the first heat source 10 decreases. If the desulfurizer 12 is continuously heated at the same heating pace even after the temperature detected by the second temperature detector 18 has become equal to or higher than the first threshold, the energy for the heating may be consumed beyond necessity, and the temperature of the desulfurizer 12 may become too high. By decreasing the heating amount of the first heat source 10, these problems can be avoided.

Embodiment 3

The hydrogen generator according to Embodiment 3 is configured such that in the hydrogen generator according to Embodiment 1, when the temperature detected by the first temperature detector becomes equal to or higher than a second threshold, the controller decreases a heating amount of the first heat source.

According to this configuration, for example, if there is a possibility that the temperature of a part of the desulfurization catalyst increases to exceed the appropriate temperature range while the first heat source is heating the desulfurization catalyst, the heating amount of the first heat source can be decreased. Therefore, a possibility that the desulfurization catalyst and the like are damaged by excess heat can be reduced.

The second threshold is set as a value that is equal to or lower than an upper limit of the use temperature of the desulfurization catalyst. The use temperature is a temperature appropriate for the use of the desulfurization catalyst and is a temperature at which the desulfurization performance is appropriately achieved. While the desulfurization catalyst is being used, the temperature control is performed such that the catalyst temperature becomes the use temperature.

The device configuration of the hydrogen generator according to Embodiment 3 may be the same as that according to Embodiment 1 except for details of the control by the controller 30, that is, the method of operating the hydrogen generator. Therefore, the same reference signs and names are used for the same components as in FIG. 1, and detailed explanations thereof are omitted.

Embodiment 3 can be modified in the same manner as Embodiments 1 and 2.

Operating Method

Figure 3:
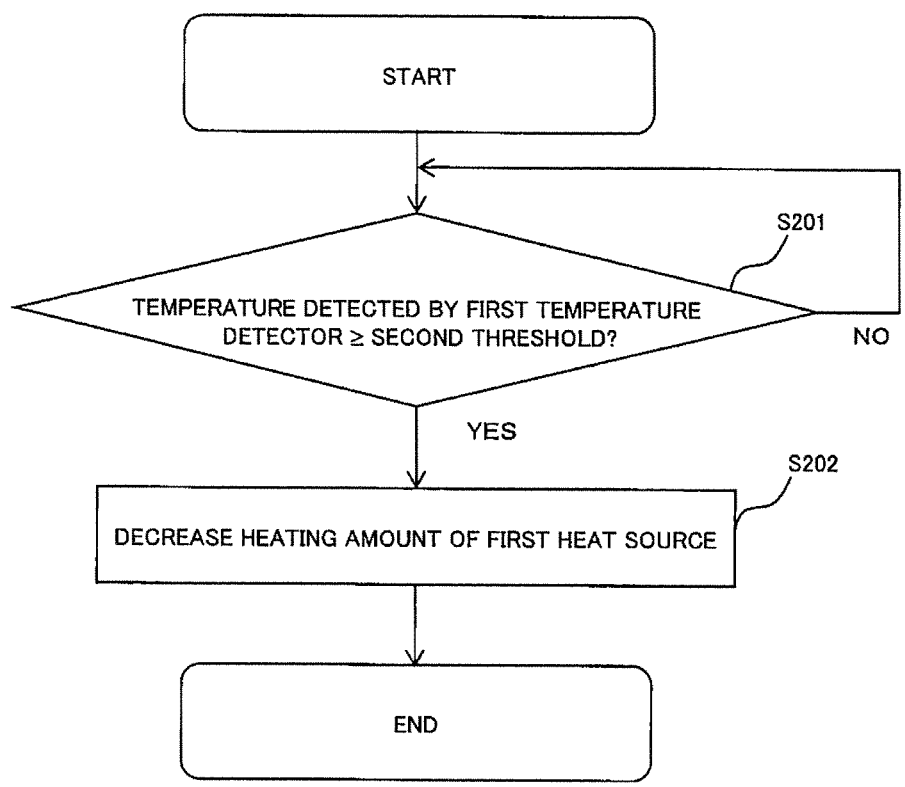
FIG. 3 is a flow chart showing one example of the method of operating the hydrogen generator according to Embodiment 3.

FIG. 3 is a flow chart showing one example of a method of operating the hydrogen generator according to Embodiment 3. Hereinafter, the method of operating the hydrogen generator according to Embodiment 3 will be explained in reference to FIG. 3. For example, the operating method shown in FIG. 3 may be executed in such a manner that the controller 30 controls respective portions of the hydrogen generator in accordance with the program stored in the controller 30.

When the operation of the hydrogen generator 100 is started, and the generation of the hydrogen-containing gas is started (START), whether or not the temperature detected by the first temperature detector 16 is equal to or higher than the second threshold is determined (Step S201).

If no in Step S201, Step S201 is executed again. If yes in Step S201, the heating amount of the first heat source 10 is decreased (Step S202). At this time, the heating amount of the first heat source 10 is suitably set, but the operation of heating the desulfurization catalyst 14 by the first heat source 10 may be stopped.

If the temperature of the desulfurization catalyst 14 becomes too high, sintering of the catalyst, carbon deposition on the catalyst, and the like occur. With this, the activity of the desulfurization catalyst 14 may decrease, or channel clogging at the desulfurizer 12 may occur. Therefore, the desulfurizer 12 needs to be used without excessively increasing the temperature of the desulfurization catalyst 14.

As described above, for example, while the first heat source 10 is heating the desulfurization catalyst 14 at the time of the start-up of the hydrogen generator 100, the first temperature detector 16 detects the temperature of the portion that becomes relatively high in temperature in the desulfurization catalyst 14. When the temperature detected by the first temperature detector 16 has become equal to or higher than the second threshold, the heating amount of the first heat source 10 is decreased. With this, the temperature of the desulfurization catalyst 14 does not become too high, and the desulfurizer 12 can be used at the appropriate temperature.

The second threshold may be, for example, 350° C. or 320° C.

In the foregoing explanation, the second threshold is set based on the use temperature of the desulfurization catalyst 14. However, the second threshold may be set based on the heat resistance of the container of the desulfurizer 12. Specifically, the second threshold is set as a value that is equal to or lower than a heat resistance temperature of the desulfurizer 12.

After the temperature detected by the first temperature detector 16 has become equal to or higher than the second threshold, the heating amount of the first heat source 10 decreases. If the desulfurizer 12 is continuously heated at the same heating pace even after the temperature detected by the first temperature detector 16 has become equal to or higher than the second threshold, the temperature of the desulfurizer 12 excessively increases. Thus, the activity of the desulfurization catalyst 14 may decrease, and the container of the desulfurizer 12 may be damaged. By decreasing the heating amount of the first heat source 10, these problems can be avoided.

Embodiments 2 and 3 may be combined.

Embodiment 4

The hydrogen generator according to Embodiment 4 is configured such that in the hydrogen generator according to Embodiment 1, when the temperature detected by the second temperature detector becomes equal to or lower than a third threshold, the controller increases a heating amount of the first heat source.

According to this configuration, for example, if there is a possibility that the temperature of a part of the desulfurization catalyst decreases beyond the appropriate temperature range while the first heat source 10 is heating the desulfurization catalyst 14 at the time of the start-up of the hydrogen generator, the heating operation performed by the first heat source can be increased. Therefore, a possibility that the reactivity of the desulfurization reaction decreases by the temperature decrease of the desulfurization catalyst can be reduced.

The third threshold is set as a value that is equal to or higher than the lower limit of the use temperature of the desulfurization catalyst. The use temperature is a temperature appropriate for the use of the desulfurization catalyst and is a temperature at which the desulfurization performance is appropriately achieved. While the desulfurization catalyst is being used, the temperature control is performed such that the catalyst temperature becomes the use temperature.

The third threshold may be lower than the first threshold.

For example, in a case where the temperature detected by the second temperature detector is the temperature of a portion whose temperature is the lowest in the desulfurization catalyst, the lower limit of the appropriate temperature range of the desulfurization catalyst may be the third threshold. For example, in a case where the temperature detected by the second temperature detector is not the temperature of the portion whose temperature is the lowest in the desulfurization catalyst, the temperature detected by the second temperature detector when the temperature of a part of the desulfurization catalyst is lower than the appropriate temperature range may be set as the third threshold.

The device configuration of the hydrogen generator according to Embodiment 4 may be the same as that according to Embodiment 1 except for details of the control by the controller 30, that is, the method of operating the hydrogen generator. Therefore, the same reference signs and names are used for the same components as in FIG. 1, and detailed explanations thereof are omitted.

The hydrogen generator according to Embodiment 4 may be configured such that in the hydrogen generator according to Embodiment 1, when the temperature detected by the second temperature detector becomes equal to or higher than a first threshold, the controller decreases a heating amount of the first heat source, and when the temperature detected by the second temperature detector becomes equal to or lower than a third threshold lower than the first threshold, the controller increases the heating amount of the first heat source.

According to this configuration, for example, if there is a possibility that the temperature of the substantially entire desulfurization catalyst is within the appropriate temperature range while the first heat source is heating the desulfurization catalyst at the time of the start-up of the hydrogen generator, the heating operation performed by the first heat source can be reduced. Therefore, the possibility that the energy is consumed by the unnecessary heating operation can be reduced. For example, if there is a possibility that the temperature of a part of the desulfurization catalyst decreases beyond the appropriate temperature range while the first heat source is heating the desulfurization catalyst at the time of the start-up of the hydrogen generator, the heating operation performed by the first heat source can be increased. Therefore, the possibility that the reactivity of the desulfurization reaction decreases by the temperature decrease of the desulfurization catalyst can be reduced.

The hydrogen generator according to Embodiment 4 may be configured such that in the hydrogen generator according to Embodiment 1, when the temperature detected by the first temperature detector becomes equal to or higher than a second threshold, the controller decreases a heating amount of the first heat source, and when the temperature detected by the second temperature detector becomes equal to or lower than a third threshold, the controller increases the heating amount of the first heat source.

According to this configuration, for example, if there is a possibility that the temperature of a part of the desulfurization catalyst increases to exceed the appropriate temperature range while the hydrogen generator is supplying the hydrogen-containing gas to a hydrogen utilizing device and the first heat source is heating the desulfurization catalyst, the heating amount of the first heat source is decreased. Therefore, the possibility that the desulfurization catalyst and the like are damaged by excess heat can be reduced. For example, if there is a possibility that the temperature of a part of the desulfurization catalyst decreases beyond the appropriate temperature range while the hydrogen generator is supplying the hydrogen-containing gas to the hydrogen utilizing device, the heating amount of the first heat source is increased. Therefore, the possibility that the reactivity of the desulfurization reaction decreases by the temperature decrease of the desulfurization catalyst can be reduced.

The hydrogen utilizing device may be any device as long as it utilizes hydrogen. Examples of the hydrogen utilizing device include a hydrogen tank and a fuel cell.

Embodiment 4 can be modified in the same manner as Embodiments 1, 2, and 3.

Operating Method

Figure 4:
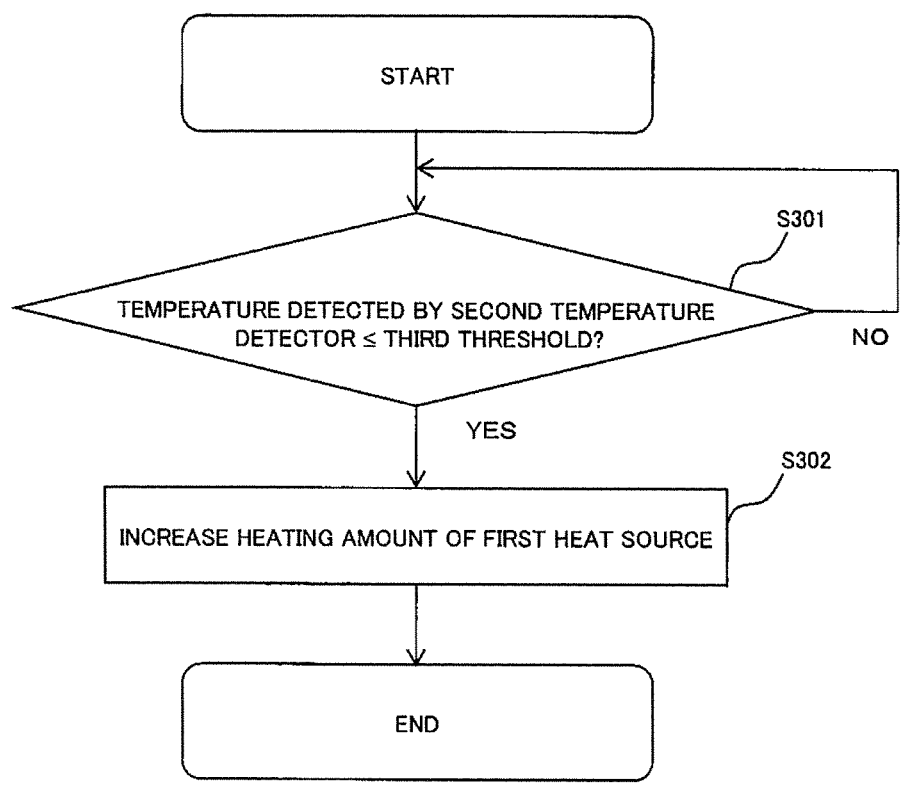
FIG. 4 is a flow chart showing one example of the method of operating the hydrogen generator according to Embodiment 4.

FIG. 4 is a flow chart showing one example of the method of operating the hydrogen generator according to Embodiment 4. Hereinafter, the method of operating the hydrogen generator according to Embodiment 4 will be explained in reference to FIG. 4. For example, the operating method shown in FIG. 4 may be executed in such a manner that the controller 30 controls respective portions of the hydrogen generator in accordance with the program stored in the controller 30.

When the operation of the hydrogen generator 100 is started, and the generation of the hydrogen is started (START), whether or not the temperature detected by the second temperature detector 18 is equal to or lower than the third threshold is determined (Step S301).

If no in Step S301, Step S301 is executed again. If yes in Step S301, the heating amount of the first heat source 10 is increased (Step S302). By increasing the heating amount of the first heat source 10, for example, the operation of heating the desulfurization catalyst 14 by the first heat source 10 is restarted.

If the temperature of the desulfurization catalyst 14 becomes too low, the desulfurization reaction hardly proceeds. Therefore, it is necessary that the substantially entire desulfurization catalyst 14 is maintained at the temperature at which the desulfurization easily occurs, and the desulfurization is performed.

As described above, for example, while the first heat source 10 is heating the desulfurization catalyst 14 at the time of the start-up of the hydrogen generator 100, the second temperature detector 18 detects the temperature of a portion that becomes relatively low in temperature in the desulfurization catalyst 14. Therefore, for example, the third threshold is set to the lower limit of the temperature range in which the desulfurization reaction easily occurs in the desulfurization catalyst 14. When the temperature detected by the second temperature detector 18 becomes equal to or lower than the third threshold, the heating amount of the first heat source 10 is increased. With this, the temperature of the desulfurization catalyst 14 does not become too low, and the desulfurizer 12 can be used at the appropriate temperature. Specifically, for example, the desulfurization reaction can be caused to proceed at the substantially entire desulfurization catalyst 14.

The third threshold may be, for example, 160° C. or 180° C.

After the temperature detected by the second temperature detector 18 has become equal to or lower than the third threshold, the heating amount of the first heat source 10 increases. If the heating amount of the first heat source 10, the heating amount being for the desulfurizer 12, is not changed, that is, maintained (including a case where the heating amount is zero or less) even after the temperature detected by the second temperature detector 18 has become equal to or lower than the third threshold, the temperature of the desulfurizer 12 excessively decreases, and the desulfurization reaction hardly proceeds at at least a part of the desulfurization catalyst 14. By increasing the heating amount of the first heat source 10, these problems can be avoided.

Embodiments 2 and 4 may be combined. Embodiments 3 and 4 may be combined. Embodiments 2, 3, and 4 may be combined.

Embodiment 5

The hydrogen generator according to Embodiment 5 is configured such that in the hydrogen generator according to Embodiment 1, when the temperature detected by the first temperature detector becomes equal to or lower than a fourth threshold, the controller increases a heating amount of the first heat source.

According to this configuration, for example, if there is a possibility that the temperature of a part of the desulfurization catalyst decreases beyond the appropriate temperature range while the hydrogen generator is supplying the hydrogen-containing gas to the hydrogen utilizing device, the heating operation performed by the first heat source can be increased. Therefore, the possibility that the reactivity of the desulfurization reaction decreases by the temperature decrease of the desulfurization catalyst can be more effectively reduced.

The hydrogen utilizing device may be any device as long as it utilizes hydrogen. Examples of the hydrogen utilizing device include a hydrogen tank and a fuel cell.

The fourth threshold is set as a value that is equal to or higher than the lower limit of the use temperature of the desulfurization catalyst. The use temperature is a temperature appropriate for the use of the desulfurization catalyst and is a temperature at which the desulfurization performance is appropriately achieved. While the desulfurization catalyst is being used, the temperature control is performed such that the catalyst temperature becomes the use temperature.

The fourth threshold may be lower than the second threshold.

The hydrogen generator according to Embodiment 5 may be configured such that in the hydrogen generator according to Embodiment 1, when the temperature detected by the first temperature detector becomes equal to or higher than a second threshold, the controller decreases a heating amount of the first heat source, and when the temperature detected by the first temperature detector becomes equal to or lower than a fourth threshold lower than the second threshold, the controller increases the heating amount of the first heat source.

According to this configuration, for example, if there is a possibility that the temperature of a part of the desulfurization catalyst increases to exceed the appropriate temperature range while the first heat source is heating the desulfurization catalyst, the heating amount of the first heat source can be decreased. Therefore, the possibility that the desulfurization catalyst and the like are damaged by excess heat can be reduced.

If there is a possibility that the temperature of a part of the desulfurization catalyst decreases beyond the appropriate temperature range while the hydrogen generator is supplying the hydrogen-containing gas to the hydrogen utilizing device, the heating operation performed by the first heat source can be increased. Therefore, the possibility that the reactivity of the desulfurization reaction decreases by the temperature decrease of the desulfurization catalyst can be more effectively reduced.

The device configuration of the hydrogen generator according to Embodiment 5 may be the same as that according to Embodiment 1 except for details of the control by the controller 30, that is, the method of operating the hydrogen generator. Therefore, the same reference signs and names are used for the same components as in FIG. 1, and detailed explanations thereof are omitted.

Embodiment 5 can be modified in the same manner as Embodiments 1, 2, 3, and 4.

Operating Method

Figure 5:
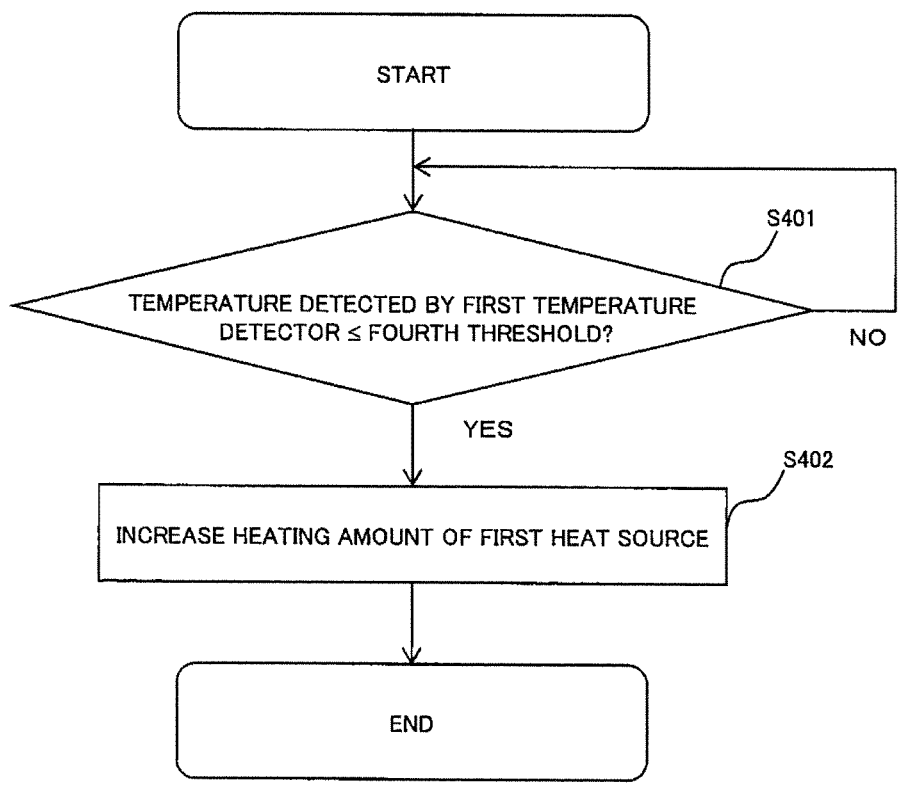
FIG. 5 is a flow chart showing one example of the method of operating the hydrogen generator according to Embodiment 5.

FIG. 5 is a flow chart showing one example of the method of operating the hydrogen generator according to Embodiment 5. Hereinafter, the method of operating the hydrogen generator according to Embodiment 5 will be explained in reference to FIG. 5. For example, the operating method shown in FIG. 5 may be executed in such a manner that the controller 30 controls respective portions of the hydrogen generator in accordance with the program stored in the controller 30.

When the operation of the hydrogen generator 100 is started, and the generation of the hydrogen is started (START), whether or not the temperature detected by the first temperature detector 16 is equal to or lower than the fourth threshold is determined (Step S401).

If no in Step S401, Step S401 is executed again. If yes in Step S401, the heating amount of the first heat source 10 is increased (Step S402). By increasing the heating amount of the first heat source 10, for example, the operation of heating the desulfurization catalyst 14 by the first heat source 10 is started.

If the temperature of the desulfurization catalyst 14 becomes too low, the desulfurization reaction hardly proceeds. Therefore, it is necessary that the substantially entire desulfurization catalyst 14 is maintained at the temperature at which the desulfurization easily occurs, and the desulfurization is performed.

As described above, for example, while the first heat source 10 is heating the desulfurization catalyst 14 at the time of the start-up of the hydrogen generator 100, the second temperature detector 18 detects the temperature of a portion that becomes relatively low in temperature in the desulfurization catalyst 14. Therefore, for example, the fourth threshold is set to the lower limit of the temperature range in which the desulfurization reaction easily occurs in the desulfurization catalyst 14.

In a case where the temperature detected by the second temperature detector 18 becomes equal to or lower than the fourth threshold while the hydrogen generator 100 is supplying the hydrogen-containing gas to the hydrogen utilizing device, the heating amount of the first heat source 10 is increased. With this, the desulfurization catalyst 14 is heated, and the desulfurizer 12 can be used at the appropriate temperature. Specifically, for example, the desulfurization reaction can be caused to proceed in the substantially entire desulfurization catalyst 14.

The fourth threshold may be, for example, 160° C. or 180° C.

After the temperature detected by the first temperature detector 16 has become equal to or lower than the fourth threshold, the heating amount of the first heat source 10 increases. If the heating amount of the first heat source 10, the heating amount being for the desulfurizer 12, is not changed, that is, maintained (including a case where the heating amount is zero or less) even after the temperature detected by the first temperature detector 16 has become equal to or lower than the fourth threshold, the temperature of the desulfurizer 12 excessively decreases, and the desulfurization reaction hardly proceeds at at least a part of the desulfurization catalyst 14. By increasing the heating amount of the first heat source 10, these problems can be avoided.

Embodiments 2 and 5 may be combined. Embodiments 3 and 5 may be combined. Embodiments 2, 3, 4, and 5 may be combined. Embodiments 2 to 5 can be combined arbitrarily.

Embodiment 6

The hydrogen generator according to Embodiment 6 is configured such that in the hydrogen generator according to any one of Embodiments 1, 2, 4, and 5, while the first heat source is heating the desulfurization catalyst at the time of start-up of the hydrogen generator, the controller controls a heating amount of the first heat source, based on the temperature detected by the second temperature detector, and while the hydrogen generator is supplying the hydrogen-containing gas to the hydrogen utilizing device, the controller controls the heating amount of the first heat source, based on the temperature detected by the first temperature detector.

According to this configuration, the first heat source is used as a main heat source at the time of the start-up, and a portion, far from the first heat source, of the desulfurization catalyst becomes lower in temperature. Therefore, the heating amount of the first heat source is controlled based on the detected temperature of the second temperature detector arranged at the portion far from the first heat source.

While the hydrogen generator is supplying the hydrogen-containing gas to the hydrogen utilizing device, the main heat source is the reformer. A portion, close to the first heat source, of the desulfurization catalyst becomes lower in temperature. To be specific, the portion that is lower in temperature in the desulfurization catalyst changes between the time of the start-up and the time when the hydrogen generator is supplying the hydrogen-containing gas to the hydrogen utilizing device. Therefore, the heating amount of the first heat source is controlled based on the detected temperature of the first temperature detector arranged at the portion closer to the first heat source.

The hydrogen utilizing device may be any device as long as it utilizes hydrogen. Examples of the hydrogen utilizing device include a hydrogen storage tank and a fuel cell.

By performing the heating control depending on situations based on the detected temperature of the temperature detector arranged at the portion that tends to become lower in temperature, the temperature of the substantially entire desulfurization catalyst is more easily maintained within the appropriate temperature range.

The device configuration of the hydrogen generator according to Embodiment 6 may be the same as that according to Embodiment 1 except for details of the control by the controller 30, that is, the method of operating the hydrogen generator. Therefore, the same reference signs and names are used for the same components as in FIG. 1, and detailed explanations thereof are omitted.

Embodiment 6 can be modified in the same manner as Embodiments 1, 2, 3, 4, and 5.

Operating Method

Figure 6:
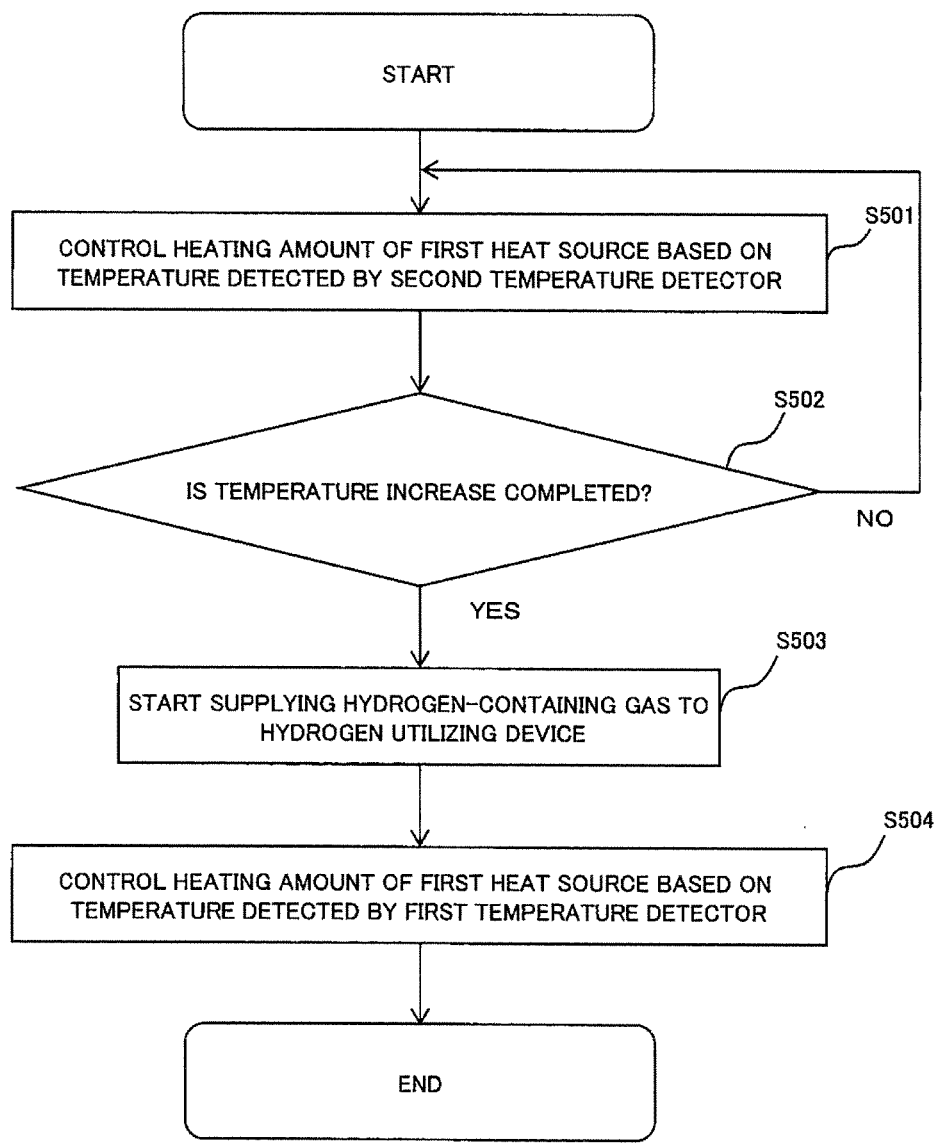
FIG. 6 is a flow chart showing one example of the method of operating the hydrogen generator according to Embodiment 5.

FIG. 6 is a flow chart showing one example of the method of operating the hydrogen generator according to Embodiment 6. Hereinafter, the method of operating the hydrogen generator according to Embodiment 6 will be explained in reference to FIG. 6. For example, the operating method shown in FIG. 6 may be executed in such a manner that the controller 30 controls respective portions of the hydrogen generator in accordance with the program stored in the controller 30.

When the operation of the hydrogen generator 100 is started, and a start-up sequence is started (START), the heating amount of the first heat source 10 is controlled based on the temperature detected by the second temperature detector 18 (Step S501).

After the temperature increase of the hydrogen generator 100 is completed (Yes in Step S502), the supply of the hydrogen-containing gas to the hydrogen utilizing device is started (Step S503).

After the supply of the hydrogen-containing gas to the hydrogen utilizing device is started, the heating amount of the first heat source 10 is controlled based on the temperature detected by the first temperature detector 16 (Step S504).

Embodiment 7

The hydrogen generator according to Embodiment 7 is configured such that: in the hydrogen generator according to any one of Embodiments 1 and 6, the desulfurizer is arranged so as to be heated by a second heat source arranged at such a position that a distance between the second heat source and the second temperature detector is shorter than a distance between the second heat source and the first temperature detector; while the first heat source is heating the desulfurization catalyst at the time of start-up of the hydrogen generator, the controller causes a heating amount of the first heat source, the heating amount being for the desulfurizer, to be larger than the heating amount of the second heat source, the heating amount being for the desulfurizer; and while the hydrogen generator is supplying the hydrogen-containing gas to the hydrogen utilizing device, the controller causes the heating amount of the second heat source, the heating amount being for the desulfurizer, to be larger than the heating amount of the first heat source, the heating amount being for the desulfurizer.

According to this configuration, since the temperature of the desulfurizer can be increased more quickly at the time of the start-up of the hydrogen generator, the start-up time of the hydrogen generator can be shortened. While the hydrogen generator is supplying the hydrogen-containing gas to the hydrogen utilizing device, the heating operation performed by the first heat source can be reduced, so that the hydrogen generator can be efficiently operated.

Device Configuration

Figure 7:
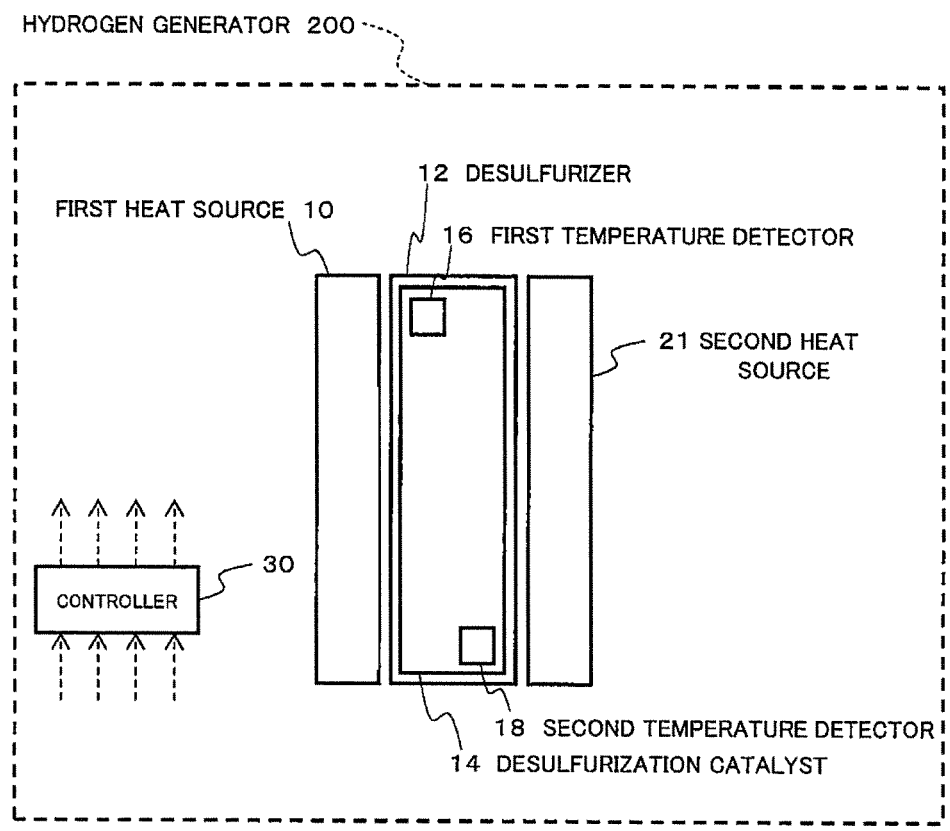
FIG. 7 is a schematic diagram showing one example of the schematic configuration of the hydrogen generator according to Embodiment 7.

FIG. 7 is a schematic diagram showing one example of a schematic configuration of the hydrogen generator according to Embodiment 7. Hereinafter, a hydrogen generator 200 according to Embodiment 7 will be explained in reference to FIG. 7.

In the example shown in FIG. 7, the hydrogen generator 200 includes a second heat source 21. The second heat source 21 is arranged at a position where the second heat source 21 can heat the desulfurization catalyst 14.

In a case where the container of the desulfurizer 12 includes the first wall surface and the second wall surface opposed to each other, and the first heat source 10 is provided adjacent to the first wall surface of the desulfurizer 12, the second heat source 21 may be, for example, arranged adjacent to the second wall surface of the desulfurizer 12. The second heat source 21 may be arranged at an upper surface, lower surface, or the like of the desulfurizer 12 or may be arranged adjacent to the first wall surface.

For example, the second heat source 21 may be a reformer configured to generate the hydrogen-containing gas from the raw material and the steam. The other examples of the second heat source 21 include: a shift converter configured to reduce the carbon monoxide in the hydrogen-containing gas and steam; a combustor configured to generate the flue gas from the combustion fuel and the combustion air; and a fuel cell. The second heat source is a device that requires a longer time to maximize the heating amount for the desulfurizer than the first heat source. The second heat source is a device that is warmed up at the time of the start-up and finishes the warm-up at the time of the completion of the start-up.

In a case where the second heat source 21 is the reformer, the reforming reaction proceeded by the reformer may be any reaction. Specific examples of the reforming reaction include a steam-reforming reaction, an autothermal reaction, and a partial oxidation reaction. Although not shown in FIG. 7, devices required for respective reforming reactions may be suitably provided. For example, in a case where the reforming reaction is the steam-reforming reaction, a combustor configured to heat the reformer, an evaporator configured to generate the steam, and a water supply unit configured to supply water to the evaporator may be provided. In a case where the reforming reaction is the autothermal reaction, an air supply unit configured to supply air to the reformer may be additionally provided.

The device configuration of the hydrogen generator 200 according to Embodiment 7 may be the same as that according to Embodiment 1 except for the above points, and details of the control by the controller 30, that is, the method of operating the hydrogen generator 200. Therefore, in FIG. 7, the same reference sings and names are used for the same components as in FIG. 1, and detailed explanations thereof are omitted.

Embodiment 7 can be modified in the same manner as Embodiment 1 and 6.

Operating Method

Figure 8:
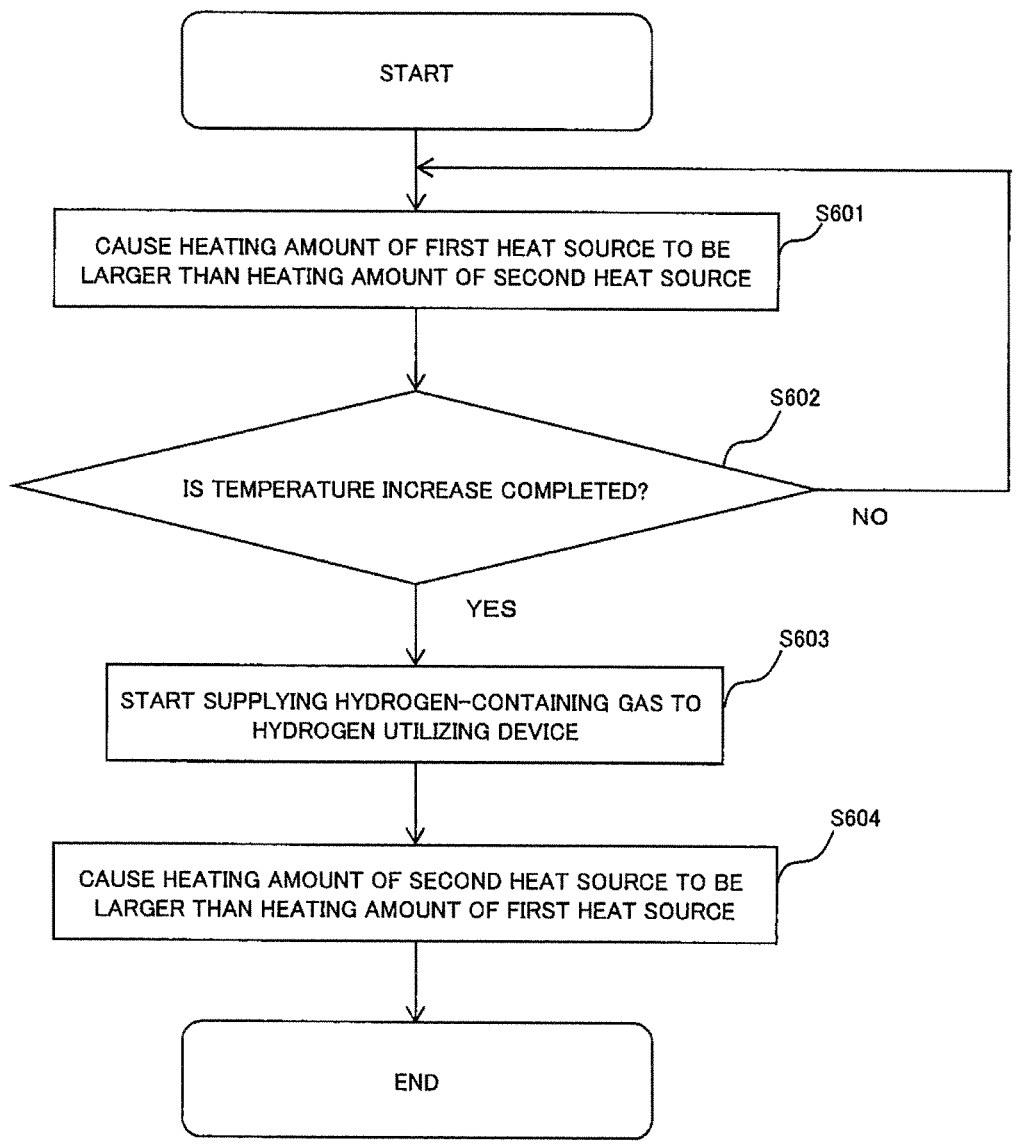
FIG. 8 is a flow chart showing one example of the method of operating the hydrogen generator according to Embodiment 7.

FIG. 8 is a flow chart showing one example of the method of operating the hydrogen generator according to Embodiment 7. Hereinafter, the method of operating the hydrogen generator according to Embodiment 7 will be explained in reference to FIG. 8. For example, the operating method shown in FIG. 8 may be executed in such a manner that the controller 30 controls respective portions of the hydrogen generator in accordance with the program stored in the controller 30.

When the operation of the hydrogen generator 200 is started, and the start-up sequence is started (START), the heating amount of the first heat source 10 is controlled to be larger than the heating amount of the second heat source 21 (Step S601).

After the temperature increase of the hydrogen generator 100 is completed (Yes in Step S602), the supply of the hydrogen-containing gas to the hydrogen utilizing device is started (Step S603).

After the supply of the hydrogen-containing gas to the hydrogen utilizing device is started, the heating amount of the second heat source 21 is controlled to be larger than the heating amount of the first heat source 10 (Step S604). Here, the hydrogen generator may be configured such that: the operation of heating the desulfurizer 12 by the first heat source 10 is stopped; and the first heat source 10 heats the desulfurizer 12 when the desulfurizer 12 needs to be heated.

Embodiment 8

The hydrogen generator according to Embodiment 8 is configured such that the hydrogen generator according to Embodiment 1 further includes a cooler arranged at a position where the cooler is able to cool down the desulfurization catalyst, wherein: the desulfurizer is arranged so as to be heated by a second heat source arranged at such a position that a distance between the second heat source and the second temperature detector is shorter than a distance between the second heat source and the first temperature detector; and when the temperature detected by the second temperature detector becomes equal to or higher than a fifth threshold, the controller causes the cooler to operate.

According to this configuration, for example, if there is a possibility that the temperature of a part of the desulfurization catalyst increases to exceed the appropriate temperature range while the hydrogen generator is supplying the hydrogen-containing gas to the hydrogen utilizing device and the second heat source is heating the desulfurization catalyst, the cooler can operate to cool down the desulfurization catalyst. Therefore, the possibility that the desulfurization catalyst and the like are damaged by excess heat can be reduced.

The fifth threshold is set as a value that is equal to or lower than the upper limit of the use temperature of the desulfurization catalyst. The use temperature is a temperature appropriate for the use of the desulfurization catalyst and is a temperature at which the desulfurization performance is appropriately achieved. While the desulfurization catalyst is being used, the temperature control is performed such that the catalyst temperature becomes the use temperature.

In the above hydrogen generator, if the temperature detected by the second temperature detector becomes equal to or higher than the fifth threshold when the heating amount of the second heat source, the heating amount being for the desulfurizer, is larger than the heating amount of the first heat source, the heating amount being for the desulfurizer, the controller may cause the cooler to operate.

In the above hydrogen generator, if the temperature detected by the second temperature detector becomes equal to or higher than the fifth threshold while the hydrogen generator is supplying the hydrogen-containing gas to the hydrogen utilizing device, the controller may cause the cooler to operate.

In the above hydrogen generator, if the temperature detected by the second temperature detector becomes equal to or higher than the fifth threshold after the completion of the temperature increase at the time of the start-up, the controller may cause the cooler to operate.

Device Configuration

Figure 9:
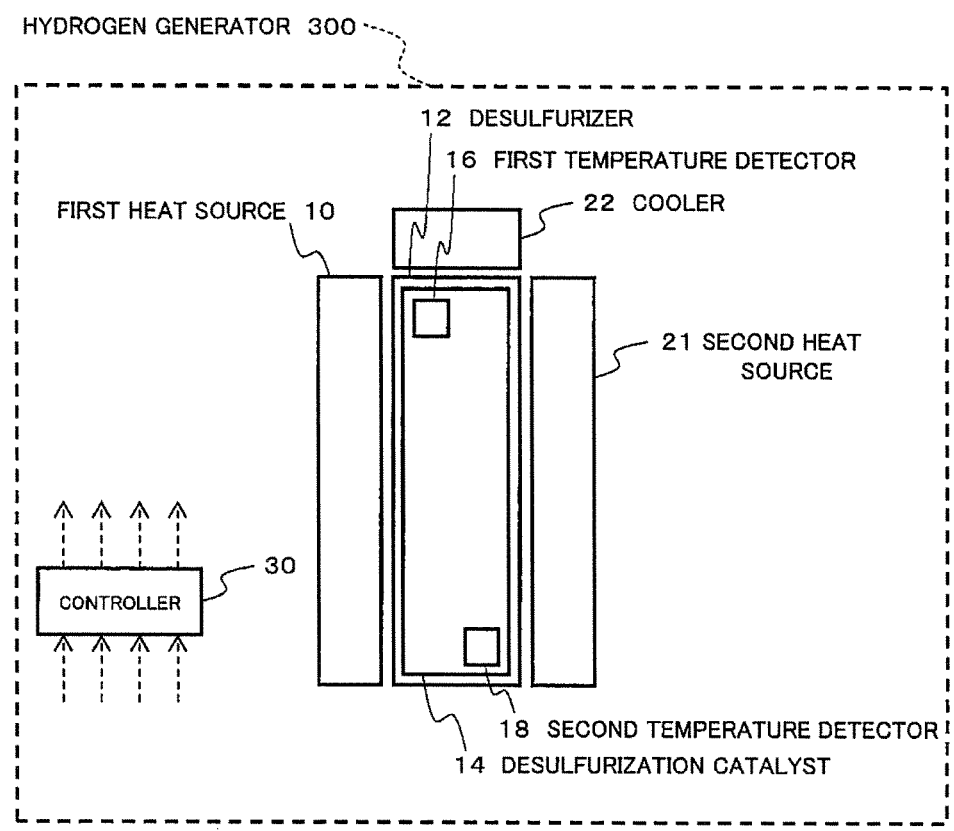
FIG. 9 is a schematic diagram showing one example of the schematic configuration of a fuel cell system according to Embodiment 8.

FIG. 9 is a schematic diagram showing one example of a schematic configuration of the hydrogen generator according to Embodiment 8. Hereinafter, a hydrogen generator 300 according to Embodiment 8 will be explained in reference to FIG. 9.

In the example shown in FIG. 9, the hydrogen generator 300 includes a cooler 22. The cooler 22 is arranged at a position where the cooler 22 can cool down the desulfurization catalyst 14.

In a case where the container of the desulfurizer 12 includes the first wall surface and the second wall surface opposed to each other, and the first heat source 10 is provided adjacent to the first wall surface of the desulfurizer 12, the cooler 22 may be, for example, arranged adjacent to the first wall surface of the desulfurizer 12. The cooler 22 may be arranged at the upper surface, lower surface, or the like of the desulfurizer 12 or may be provided adjacent to the first wall surface. The cooler 22 may be provided adjacent to a portion that tends to have the highest temperature in the desulfurization catalyst 14. The cooler 22 may be provided adjacent to the first temperature detector 16.

Examples of the cooler 22 include a cooling fan, a cooling pipe connected to a cooling water pump, and a heat exchanger.

The device configuration of the hydrogen generator 300 according to Embodiment 8 may be the same as that according to Embodiment 7 except for the above points, and details of the control by the controller 30, that is, the method of operating the hydrogen generator 300. Therefore, in FIG. 9, the same reference signs and names are used for the same components as in FIG. 7, and detailed explanations thereof are omitted.

Embodiment 8 can be modified in the same manner as Embodiments 1 and 7.

Operating Method

Figure 10:
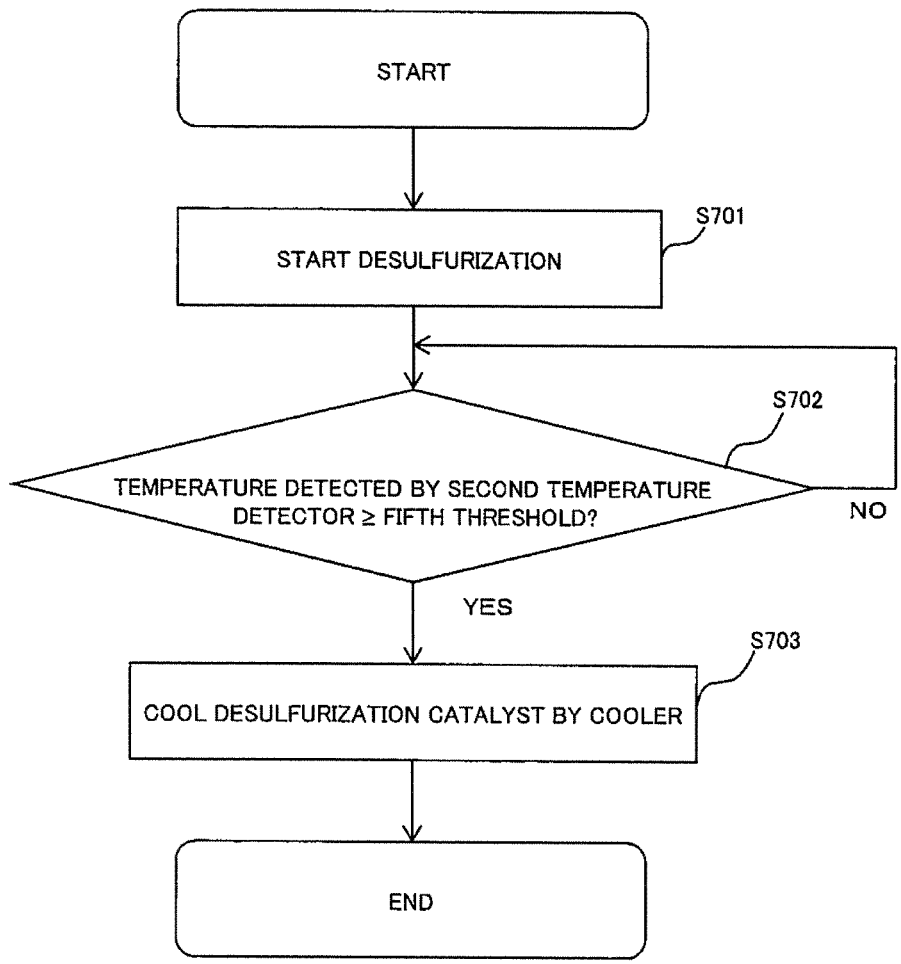
FIG. 10 is a flow chart showing one example of the method of operating the hydrogen generator according to Embodiment 8.

FIG. 10 is a flow chart showing one example of the method of operating the hydrogen generator according to Embodiment 8. Hereinafter, the method of operating the hydrogen generator according to Embodiment 8 will be explained in reference to FIG. 10. For example, the operating method shown in FIG. 10 may be executed in such a manner that the controller 30 controls respective portions of the hydrogen generator in accordance with the program stored in the controller 30.

When the operation of the hydrogen generator 300 is started (START), and the desulfurization is started (Step S701), whether or not the temperature detected by the second temperature detector 18 is equal to or higher than the fifth threshold is determined (Step S702).

If no in Step S702, Step S702 is executed again. If yes in Step S702, the operation of the cooler 22 is started (Step S703). When the operation of the cooler 22 is started, for example, an operation of cooling the desulfurization catalyst 14 by the cooler 22 is started.

If the temperature of the desulfurization catalyst 14 becomes too high, the sintering of the catalyst, the carbon deposition on the catalyst, and the like occur. With this, the activity of the desulfurization catalyst 14 may decrease, or the channel clogging at the desulfurizer 12 may occur. Therefore, the desulfurizer 12 needs to be used without excessively increasing the temperature of the desulfurization catalyst 14.

As described above, for example, the second temperature detector 18 detects the temperature of a portion that relatively becomes high in temperature in the desulfurization catalyst 14 while the hydrogen generator is supplying the hydrogen-containing gas to the hydrogen utilizing device. When the temperature detected by the second temperature detector 18 becomes equal to or higher than the fifth threshold, the cooler is caused to operate. With this, the temperature of the desulfurization catalyst 14 does not become too high, and the desulfurizer 12 can be used at the appropriate temperature.

The fifth threshold may be, for example, 350° C. or 320° C.

In the foregoing explanation, the fifth threshold is set based on the use temperature of the desulfurization catalyst 14. However, the fifth threshold may be set based on the heat resistance temperature of the desulfurizer 12. Specifically, the fifth threshold is set as a value that is equal to or lower than the heat resistance temperature of the desulfurizer 12.

After the temperature detected by the first temperature detector 16 has become equal to or higher than the fifth threshold, the cooler 22 operates. If the desulfurizer 12 is continuously heated at the same heating pace even after the temperature detected by the second temperature detector 18 has become equal to or higher than the fifth threshold, the temperature of the desulfurizer 12 excessively increases. Thus, the activity of the desulfurization catalyst 14 may decrease, and the container of the desulfurizer 12 may be damaged. By causing the cooler 22 to operate, these problems can be avoided.

Embodiments 2 and 8 may be combined. Embodiments 4 and 8 may be combined. Embodiments 2, 4, 5, and 8 may be combined. Embodiments 2 to 8 may be combined arbitrarily.

Embodiment 9

The hydrogen generator according to Embodiment 9 is configured such that: in the hydrogen generator according to Embodiment 1, the desulfurizer is arranged so as to be heated by a second heat source arranged at such a position that a distance between the second heat source and the second temperature detector is shorter than a distance between the second heat source and the first temperature detector; when the temperature detected by the second temperature detector becomes equal to or higher than a sixth threshold, the controller decreases a heating amount of the second heat source; and when the temperature detected by the second temperature detector becomes equal to or lower than a seventh threshold lower than the sixth threshold, the controller increases the heating amount of the second heat source.

According to this configuration, for example, if there is a possibility that the temperature of a part of the desulfurization catalyst increases to exceed the appropriate temperature range while the hydrogen generator is supplying the hydrogen-containing gas to the hydrogen utilizing device and the second heat source is heating the desulfurization catalyst, the heating amount of the second heat source can be decreased. Therefore, the possibility that the desulfurization catalyst and the like are damaged by excess heat can be reduced. Further, for example, if there is a possibility that the temperature of a part of the desulfurization catalyst decreases beyond the appropriate temperature range while the hydrogen generator is supplying the hydrogen-containing gas to the hydrogen utilizing device and the second heat source is heating the desulfurization catalyst, the heating operation performed by the second heat source can be increased. Therefore, the possibility that the reactivity of the desulfurization reaction decreases by the temperature decrease of the desulfurization catalyst can be reduced.

The sixth threshold is set as a value that is equal to or lower than the upper limit of the use temperature of the desulfurization catalyst. The use temperature is a temperature appropriate for the use of the desulfurization catalyst and is a temperature at which the desulfurization performance is appropriately achieved. While the desulfurization catalyst is being used, the temperature control is performed such that the catalyst temperature becomes the use temperature.

The seventh threshold may be set as a value that is equal to or lower than the upper limit of the use temperature of the desulfurization catalyst. The use temperature is a temperature appropriate for the use of the desulfurization catalyst and is a temperature at which the desulfurization performance is appropriately achieved. While the desulfurization catalyst is being used, the temperature control is performed such that the catalyst temperature becomes the use temperature.

The device configuration of the hydrogen generator according to Embodiment 9 may be the same as that according to Embodiment 7 except for details of the control by the controller 30, that is, the method of operating the hydrogen generator. Therefore, the same reference signs and names are used for the same components as in FIG. 7, and detailed explanations thereof are omitted.

Operating Method

Figure 11:
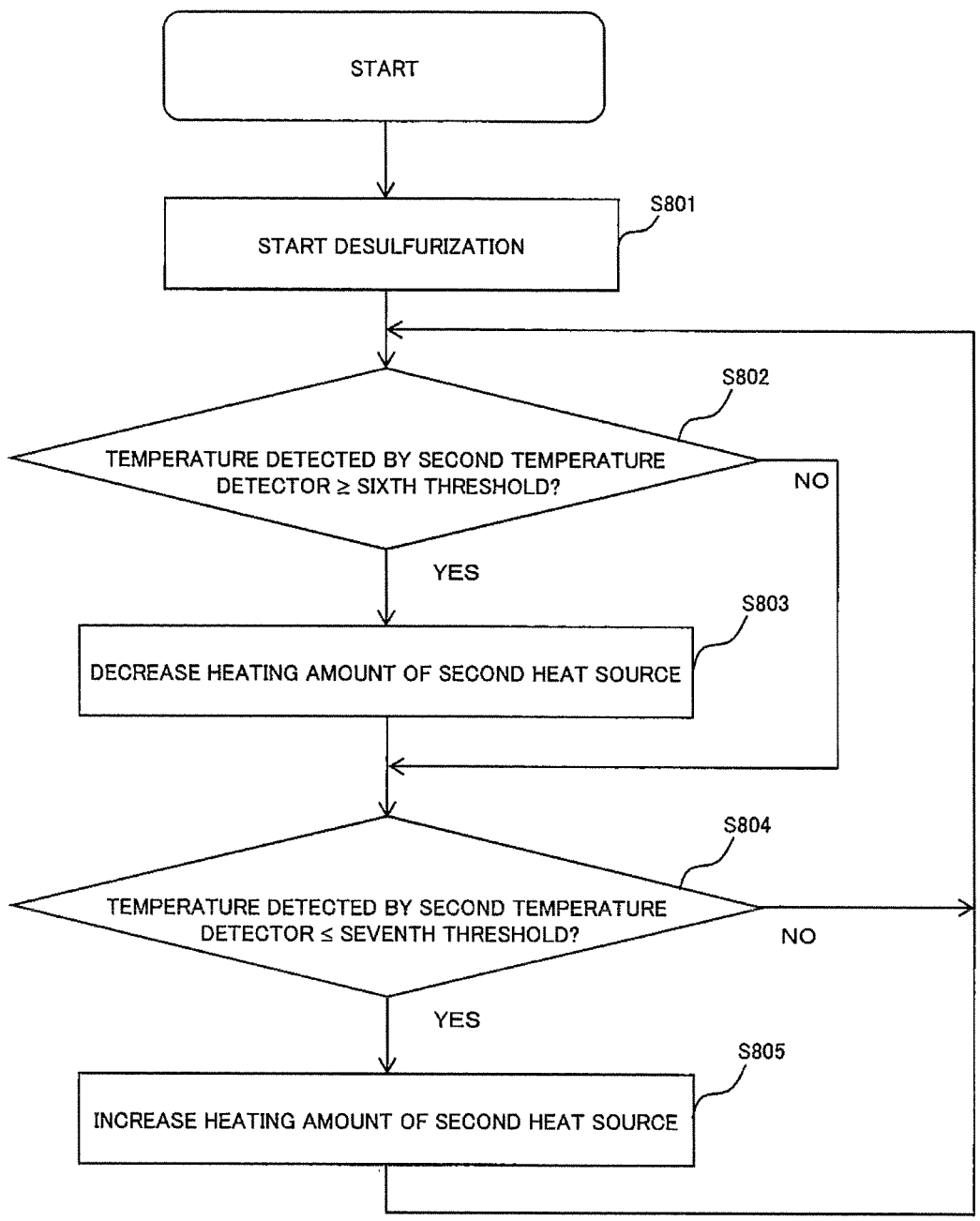
FIG. 11 is a flow chart showing one example of the method of operating the hydrogen generator according to Embodiment 9.

FIG. 11 is a flow chart showing one example of the method of operating the hydrogen generator according to Embodiment 9. Hereinafter, the method of operating the hydrogen generator according to Embodiment 9 will be explained in reference to FIG. 11. For example, the operating method shown in FIG. 11 may be executed in such a manner that the controller 30 controls respective portions of the hydrogen generator in accordance with the program stored in the controller 30.

When the operation of the hydrogen generator 200 is started (START), and the desulfurization is started (Step S801), whether or not the temperature detected by the second temperature detector 18 is equal to or higher than the sixth threshold is determined (Step S802).

If yes in Step S802, the heating amount of the second heat source 21 is decreased (Step S803).

If no in Step S802 or when Step S803 is completed, whether or not the temperature detected by the second temperature detector 18 is equal to or lower than the seventh threshold is determined (Step S804).

If yes in Step S804, the heating amount of the second heat source 21 is increased (Step S805).

If no in Step S804 or when Step S805 is completed, the process returns to the determination in Step S802.

Embodiment 10

The hydrogen generator according to Embodiment 10 is configured such that: the hydrogen generator according to Embodiment 1 further includes a cooler arranged at a position where the cooler is able to cool down the desulfurization catalyst, wherein: the desulfurizer is arranged so as to be heated by a second heat source arranged at such a position that a distance between the second heat source and the second temperature detector is shorter than a distance between the second heat source and the first temperature detector; when the temperature detected by the second temperature detector becomes equal to or lower than an eighth threshold, the controller increases a heating amount of the second heat source; and when the temperature detected by the second temperature detector becomes equal to or higher than a fifth threshold, the controller causes the cooler to operate.

According to this configuration, for example, if there is a possibility that the temperature of a part of the desulfurization catalyst decreases beyond the appropriate temperature range while the hydrogen generator is supplying the hydrogen-containing gas to the hydrogen utilizing device and the second heat source is heating the desulfurization catalyst, the heating operation performed by the second heat source can be increased. Therefore, the possibility that the reactivity of the desulfurization reaction decreases by the temperature decrease of the desulfurization catalyst can be reduced. Further, for example, if there is a possibility that the temperature of a part of the desulfurization catalyst increases to exceed the appropriate temperature range while the hydrogen generator is supplying the hydrogen-containing gas to the hydrogen utilizing device and the second heat source is heating the desulfurization catalyst, the temperature of the desulfurization catalyst can be decreased by the cooler. Therefore, the possibility that the desulfurization catalyst and the like are damaged by excess heat can be reduced.

The eighth threshold is set as a value that is equal to or higher than the lower limit of the use temperature of the desulfurization catalyst. The use temperature is a temperature appropriate for the use of the desulfurization catalyst and is a temperature at which the desulfurization performance is appropriately achieved. While the desulfurization catalyst is being used, the temperature control is performed such that the catalyst temperature becomes the use temperature.

The device configuration of the hydrogen generator according to Embodiment 10 may be the same as that according to Embodiment 8 except for details of the control by the controller 30, that is, the method of operating the hydrogen generator. Therefore, the same reference signs and names are used for the same components as in FIG. 9, and detailed explanations thereof are omitted.

In the above hydrogen generator, if the temperature detected by the second temperature detector becomes equal to or higher than the fifth threshold when the heating amount of the second heat source, the heating amount being for the desulfurizer, is larger than the heating amount of the first heat source, the heating amount being for the desulfurizer, the controller may cause the cooler to operate.

In the above hydrogen generator, if the temperature detected by the second temperature detector becomes equal to or higher than the fifth threshold while the hydrogen generator is supplying the hydrogen-containing gas to the hydrogen utilizing device, the controller may cause the cooler to operate.

In the above hydrogen generator, if the temperature detected by the second temperature detector becomes equal to or higher than the fifth threshold after the completion of the temperature increase at the time of the start-up, the controller may cause the cooler to operate.

Operating Method

Figure 12:
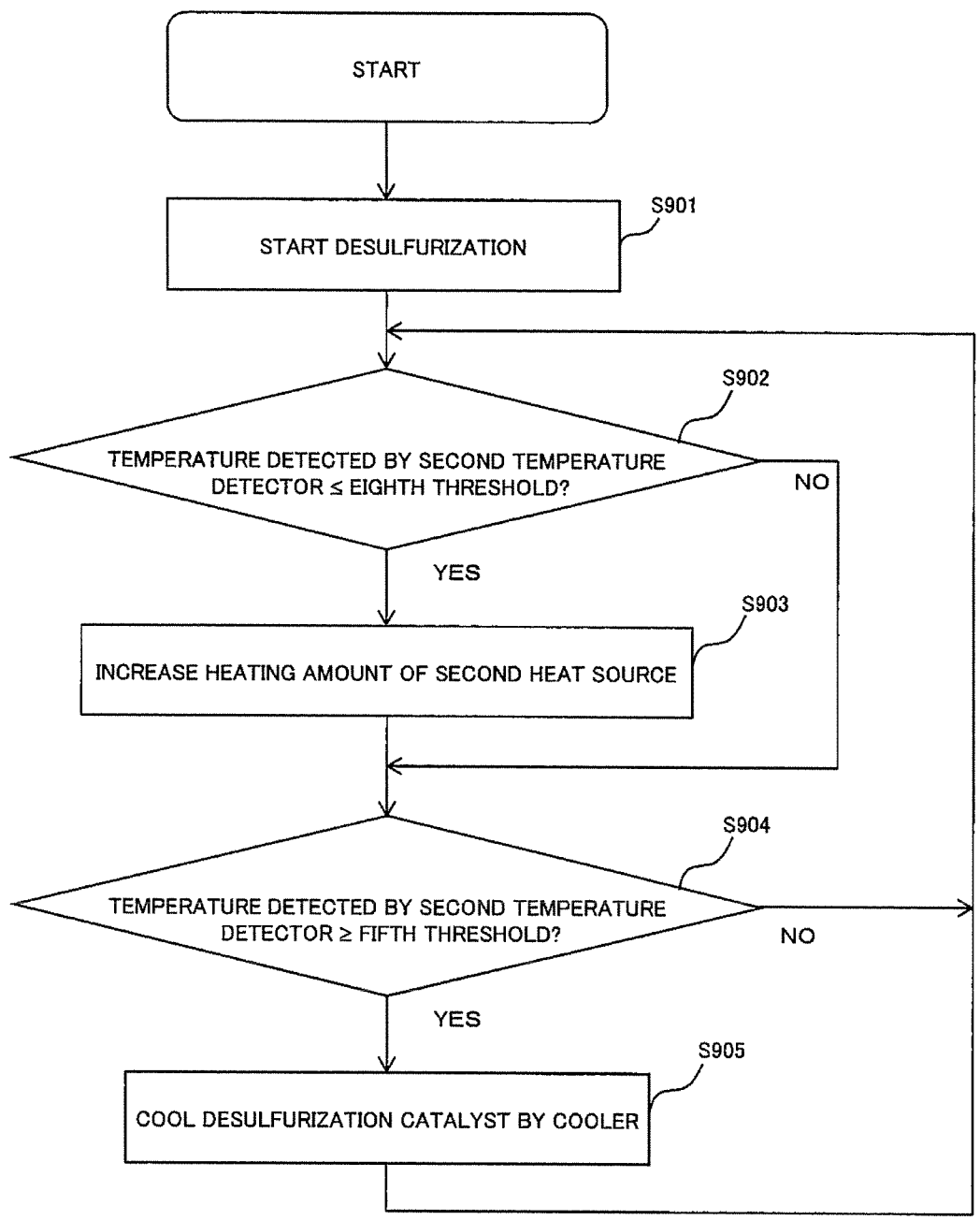
FIG. 12 is a flow chart showing one example of the method of operating the hydrogen generator according to Embodiment 10.

FIG. 12 is a flow chart showing one example of the method of operating the hydrogen generator according to Embodiment 10. Hereinafter, the method of operating the hydrogen generator according to Embodiment 10 will be explained in reference to FIG. 12. For example, the operating method shown in FIG. 12 may be executed in such a manner that the controller 30 controls respective portions of the hydrogen generator in accordance with the program stored in the controller 30.

When the operation of the hydrogen generator 300 is started (START), and the desulfurization is started (Step S901), whether or not the temperature detected by the second temperature detector 18 is equal to or lower than the eighth threshold is determined (Step S902).

If yes in Step S902, the heating amount of the second heat source 21 is increased (Step S903).

If no in Step S902 or when Step S903 is completed, whether or not the temperature detected by the second temperature detector 18 is equal to or higher than the fifth threshold is determined (Step S904).

If yes in Step S904, the operation of the cooler 22 is started (Step S905).

If no in Step S904 or when Step S905 is completed, the process returns to the determination in Step S902.

Embodiment 11

A fuel cell system according to Embodiment 11 includes the hydrogen generator according to any one of Embodiments 1 to 10 and a fuel cell configured to generate electric power using the hydrogen-containing gas supplied from the hydrogen generator.

According to this configuration, the temperature of the desulfurization catalyst is more easily maintained within the appropriate range.

Device Configuration

Figure 13:
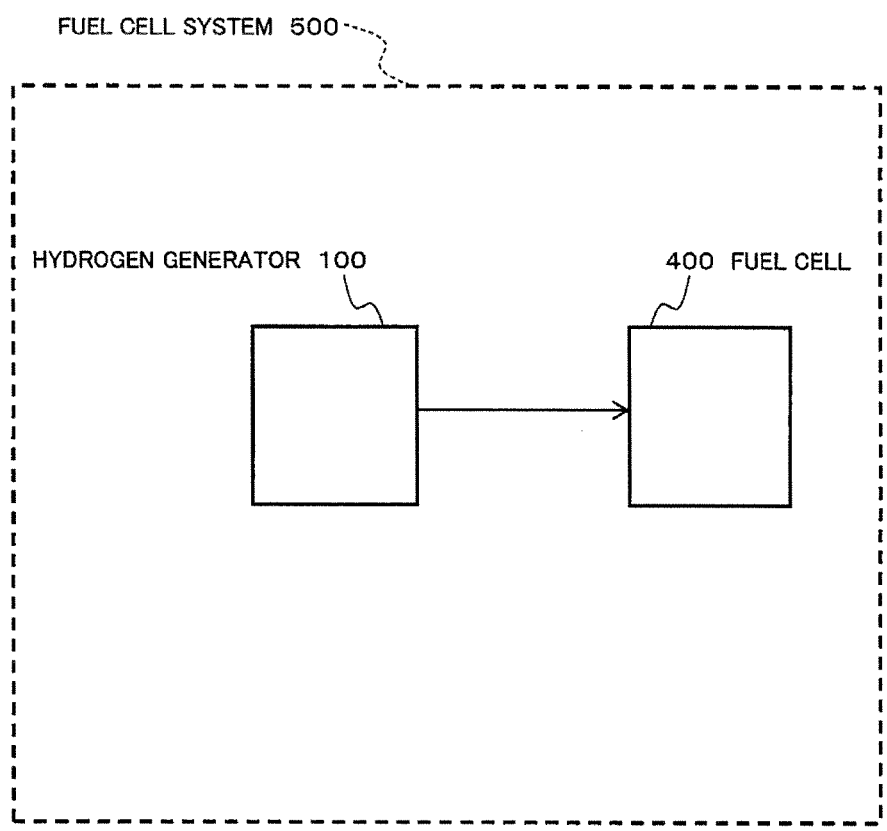
FIG. 13 is a block diagram showing one example of the schematic configuration of the fuel cell system according to Embodiment 11.

FIG. 13 is a block diagram showing one example of a schematic configuration of the fuel cell system according to Embodiment 11. Hereinafter, a fuel cell system 500 according to Embodiment 7 will be explained in reference to FIG. 13.

In the example shown in FIG. 13, the fuel cell system 500 includes the hydrogen generator 100 and a fuel cell 400.

The fuel cell 400 generates electric power using the hydrogen-containing gas supplied from the hydrogen generator 100. The fuel cell may be any type of fuel cell. Examples of the fuel cell include a polymer electrolyte fuel cell, a solid-oxide fuel cell, and a phosphoric-acid fuel cell. In a case where the fuel cell is the solid-oxide fuel cell, the reformer and the fuel cell may be incorporated in a single container to constitute a hot module.

The hydrogen generator 100 is the same in configuration as the hydrogen generator 100 according to Embodiment 1. Therefore, a detailed explanation thereof is omitted. The hydrogen generator 100 may be the hydrogen generator according to any one of Embodiments 2 to 10 or may be the hydrogen generator obtained by arbitrarily combining Embodiments 2 to 10.

The operations of the fuel cell system 500 may be the same as those according to Embodiments 1 to 10 except that the fuel cell 400 generates electric power using the hydrogen-containing gas supplied from the hydrogen generator 100. Therefore, detailed explanations thereof are omitted.

From the foregoing explanation, many modifications and other embodiments of the present invention are obvious to one skilled in the art. Therefore, the foregoing explanation should be interpreted only as an example and is provided for the purpose of teaching the best mode for carrying out the present invention to one skilled in the art. The structures and/or functional details may be substantially modified within the spirit of the present invention.

INDUSTRIAL APPLICABILITY

One aspect of the present invention is useful as the hydrogen generator by which the temperature of the desulfurization catalyst is more easily maintained within the appropriate range, and the fuel cell system including the hydrogen generator.

REFERENCE SIGNS LIST

10 first heat source
12 desulfurizer
14 desulfurization catalyst
16 first temperature detector
18 second temperature detector
20 reformer
21 second heat source
22 cooler
30 controller
100, 200, 300 hydrogen generator
400 fuel cell
500 fuel cell system

The invention claimed is:

1. A hydrogen generator comprising:
a desulfurizer including a desulfurization catalyst that removes a sulfur compound in a raw material, the desulfurization catalyst being arranged so as to be heated by a first heat source;
a reformer configured to generate a hydrogen-containing gas using the raw material having flowed through the desulfurizer;
a first temperature detector configured to detect a temperature of a predetermined portion of the desulfurization catalyst;
a second temperature detector configured to detect the temperature of a portion of the desulfurization catalyst, the portion being located such that a distance between the portion and the first heat source is longer than a distance between the predetermined portion and the first heat source; and a controller configured to control an operation of heating the desulfurization catalyst by the first heat source, based on detection results of the first temperature detector and the second temperature detector.

2. The hydrogen generator according to claim 1, wherein when the temperature detected by the second temperature detector becomes equal to or higher than a first threshold, the controller decreases a heating amount of the first heat source.

3. The hydrogen generator according to claim 1, wherein when the temperature detected by the first temperature detector becomes equal to or higher than a second threshold, the controller decreases a heating amount of the first heat source.

4. The hydrogen generator according to claim 1, wherein when the temperature detected by the second temperature detector becomes equal to or lower than a third threshold, the controller increases a heating amount of the first heat source.

5. The hydrogen generator according to claim 1, wherein when the temperature detected by the first temperature detector becomes equal to or lower than a fourth threshold, the controller increases a heating amount of the first heat source.

6. The hydrogen generator according to claim 1, wherein:
while the first heat source is heating the desulfurization catalyst at the time of start-up of the hydrogen generator, the controller controls a heating amount of the first heat source, based on the temperature detected by the second temperature detector; and
while the hydrogen generator is supplying the hydrogen-containing gas to the hydrogen utilizing device, the controller controls the heating amount of the first heat source, based on the temperature detected by the first temperature detector.

7. The hydrogen generator according to claim 1, wherein:
the desulfurizer is arranged so as to be heated by a second heat source arranged at such a position that a distance between the second heat source and the second temperature detector is shorter than a distance between the second heat source and the first temperature detector;
while the first heat source is heating the desulfurization catalyst at the time of start-up of the hydrogen generator, the controller causes a heating amount of the first heat source, the heating amount being for the desulfurizer, to be larger than the heating amount of the second heat source, the heating amount being for the desulfurizer; and
while the hydrogen generator is supplying the hydrogen-containing gas to the hydrogen utilizing device, the controller causes the heating amount of the second heat source, the heating amount being for the desulfurizer, to be larger than the heating amount of the first heat source, the heating amount being for the desulfurizer.

8. The hydrogen generator according to claim 7, wherein the second heat source is the reformer.

9. The hydrogen generator according to claim 1, further comprising a cooler arranged at a position where the cooler is able to cool down the desulfurization catalyst, wherein:
the desulfurizer is arranged so as to be heated by a second heat source arranged at such a position that a distance between the second heat source and the second temperature detector is shorter than a distance between the second heat source and the first temperature detector; and
when the temperature detected by the second temperature detector becomes equal to or higher than a fifth threshold, the controller causes the cooler to operate.

10. The hydrogen generator according to claim 1, wherein:
when the temperature detected by the second temperature detector becomes equal to or higher than a first threshold, the controller decreases a heating amount of the first heat source; and
when the temperature detected by the second temperature detector becomes equal to or lower than a third threshold lower than the first threshold, the controller increases the heating amount of the first heat source.

11. The hydrogen generator according to claim 1, wherein:
when the temperature detected by the first temperature detector becomes equal to or higher than a second threshold, the controller decreases a heating amount of the first heat source; and
when the temperature detected by the first temperature detector becomes equal to or lower than a fourth threshold lower than the second threshold, the controller increases the heating amount of the first heat source.

12. The hydrogen generator according to claim 1, wherein:
when the temperature detected by the first temperature detector becomes equal to or higher than a second threshold, the controller decreases a heating amount of the first heat source; and
when the temperature detected by the second temperature detector becomes equal to or lower than a third threshold, the controller increases the heating amount of the first heat source.

13. The hydrogen generator according to claim 1, wherein:
the desulfurizer is arranged so as to be heated by a second heat source arranged at such a position that a distance between the second heat source and the second temperature detector is shorter than a distance between the second heat source and the first temperature detector;
when the temperature detected by the second temperature detector becomes equal to or higher than a sixth threshold, the controller decreases a heating amount of the second heat source; and
when the temperature detected by the second temperature detector becomes equal to or lower than a seventh threshold lower than the sixth threshold, the controller increases the heating amount of the second heat source.

14. The hydrogen generator according to claim 1, further comprising a cooler arranged at a position where the cooler is able to cool down the desulfurization catalyst, wherein:
the desulfurizer is arranged so as to be heated by a second heat source arranged at such a position that a distance between the second heat source and the second temperature detector is shorter than a distance between the second heat source and the first temperature detector;
when the temperature detected by the second temperature detector becomes equal to or lower than an eighth threshold, the controller increases a heating amount of the second heat source; and
when the temperature detected by the second temperature detector becomes equal to or higher than a fifth threshold, the controller causes the cooler to operate.

15. The hydrogen generator according to claim 1, wherein the first heat source is an electric heater.

16. A fuel cell system comprising:
the hydrogen generator according to claim 1; and
a fuel cell configured to generate electric power using the hydrogen-containing gas supplied from the hydrogen generator.

* * * * *